United States Patent
Arendt et al.

(10) Patent No.: US 9,725,573 B2
(45) Date of Patent: *Aug. 8, 2017

(54) MONOBENZOATE USEFUL AS A PLASTICIZER IN PLASTISOL COMPOSITIONS

(71) Applicant: EMERALD KALAMA CHEMICAL, LLC, Kalama, WA (US)

(72) Inventors: William D. Arendt, Libertyville, IL (US); Emily McBride, Kalama, WA (US)

(73) Assignee: EMERALD KALAMA CHEMICAL, LLC, Kalama, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/291,660

(22) Filed: May 30, 2014

(65) Prior Publication Data

US 2014/0275376 A1    Sep. 18, 2014

Related U.S. Application Data

(63) Continuation-in-part of application No. PCT/US2013/026049, filed on Feb. 14, 2013.
(Continued)

(51) Int. Cl.
*C08K 5/101* (2006.01)
*C08K 5/00* (2006.01)
(Continued)

(52) U.S. Cl.
CPC ............ *C08K 5/101* (2013.01); *C08K 5/0008* (2013.01); *C08K 5/0016* (2013.01); *C08K 5/12* (2013.01);
(Continued)

(58) Field of Classification Search
CPC ...................................................... C08K 5/101
See application file for complete search history.

(56) References Cited

U.S. PATENT DOCUMENTS

| 1,899,214 A | 2/1933 | Smith |
| 2,428,716 A | 10/1947 | McGill et al. |
| (Continued) | | |

FOREIGN PATENT DOCUMENTS

| GB | 1103681 A | * 2/1968 | ........... C08K 5/0016 |
| GB | 1 321 383 | 6/1972 | |
| (Continued) | | | |

OTHER PUBLICATIONS

Japanese Official Action dated Feb. 16, 2016 for corresponding application 2014-556828.
(Continued)

*Primary Examiner* — Lanee Reuther
(74) *Attorney, Agent, or Firm* — Hudak, Shunk & Farine Co. LPA

(57) ABSTRACT

A unique monobenzoate useful as a plasticizer in polymeric dispersions, such as plastisols and melt compounds. The monobenzoate comprises 3-phenyl propyl benzoate, a benzoate ester heretofore known as a flavoring and fragrance agent, but not previously utilized as a plasticizer in polymeric applications. Depending on the application, the advantages rendered by the use of the inventive monobenzoate include, among other things, excellent solvating properties, low viscosity, viscosity stability, and improved rheology, as well as health, safety and environmental advantages over traditional plasticizers. The monobenzoate may be used alone or in combination with a variety of plasticizers, including but not limited to phthalates, terephthalates, dibenzoates, other monobenzoates, or 1,2-cyclohexane dicarboxylate esters, and mixtures thereof.

6 Claims, 20 Drawing Sheets

Rheology Data, Initial

Related U.S. Application Data

(60) Provisional application No. 61/598,372, filed on Feb. 14, 2012.

(51) Int. Cl.

| | | |
|---|---|---|
| *C08K 5/12* | (2006.01) | |
| *C08L 91/00* | (2006.01) | |
| *C09D 7/12* | (2006.01) | |
| *C09D 11/00* | (2014.01) | |
| *C09J 131/04* | (2006.01) | |

(52) U.S. Cl.
CPC ............ *C08L 91/00* (2013.01); *C09D 7/1233* (2013.01); *C09D 11/00* (2013.01); *C09J 131/04* (2013.01)

(56) References Cited

U.S. PATENT DOCUMENTS

| | | |
|---|---|---|
| 5,236,987 A | 8/1993 | Arendt |
| 5,990,214 A | 11/1999 | Arendt et al. |
| 6,184,278 B1 | 2/2001 | Arendt et al. |
| 6,689,830 B1 | 2/2004 | Arendt et al. |
| 7,071,252 B2 | 7/2006 | Stanhope et al. |
| 7,629,413 B2 | 12/2009 | Godwin et al. |
| 7,638,568 B2 | 12/2009 | Grass et al. |
| 8,034,860 B2 | 10/2011 | Arendt et al. |
| 2005/0049341 A1* | 3/2005 | Grass ............... C08J 9/0014 524/306 |
| 2005/0152858 A1* | 7/2005 | Bertz ............... A61K 8/0229 424/59 |
| 2008/0021141 A1 | 1/2008 | Arendt et al. |
| 2008/0119577 A1 | 5/2008 | Arendt et al. |
| 2008/0139680 A1 | 6/2008 | Arendt et al. |
| 2010/0048778 A1 | 2/2010 | Godwin et al. |
| 2013/0274396 A1 | 10/2013 | Arendt et al. |

FOREIGN PATENT DOCUMENTS

| | | |
|---|---|---|
| JP | 2005054187 A | 3/2005 |
| JP | 2007518689 A | 7/2007 |
| JP | 2008514697 A | 5/2008 |
| JP | 2009544817 A | 12/2009 |
| WO | 02058644 A1 | 8/2002 |
| WO | 2008014505 A2 | 1/2008 |

OTHER PUBLICATIONS

Invitation to Respond to Written Opinion and Written Opinion from Singapore, dated Sep. 14, 2016.
Royal Society of Chemistry, Benzyl benzoate, ChemSpider Web pages, accessed on Jul. 22, 2015 at http://www.chemspider.com/chemical structure.13856959.
Royal Society of Chemistry, Phenylethyl benzoate, ChemSpider Web pages, accessed on Jun. 22, 2015 at http://www.chemspider.com/chemical structure.206388.
Royal Society of Chemistry, Phenylpropyl benzoate, ChemSpider Web pages, accessed on Jul. 22, 2015 at http://www.chemspider.com/chemical structure.307158.
Arendt, William, et al., Handbook of Vinyl Formulating, 2008, pp. 239-286, Chapter 8, John Wiley & Sons, Inc., Hoboken, NJ, USA.

\* cited by examiner

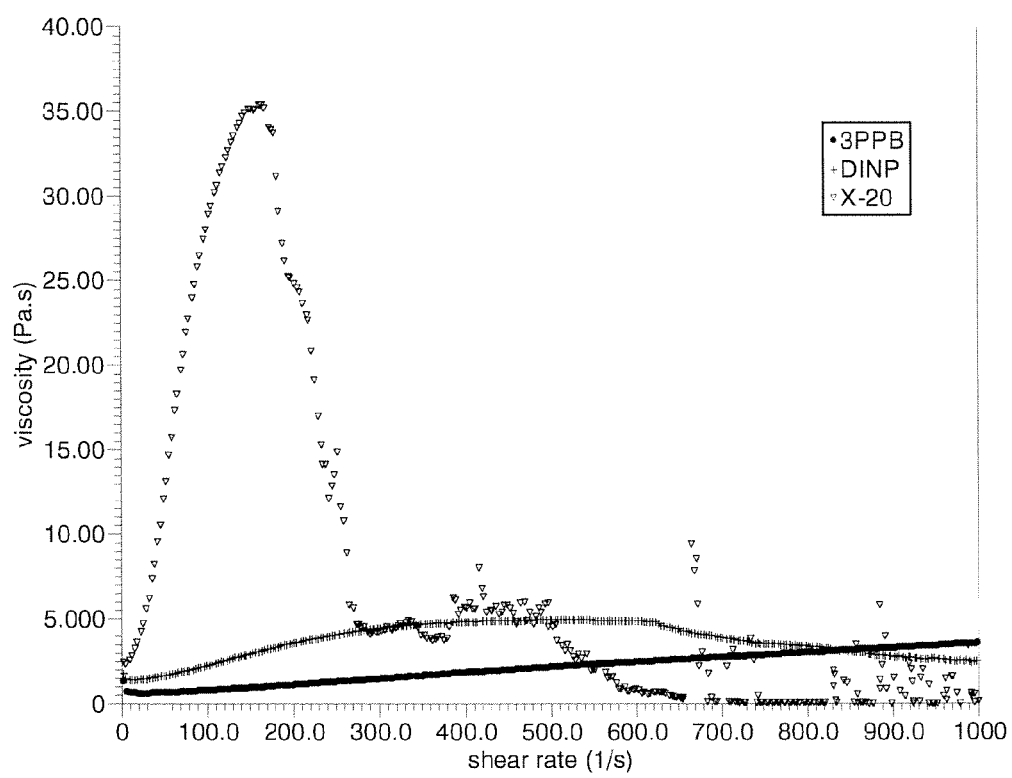
FIG. 1 Rheology Data, Initial

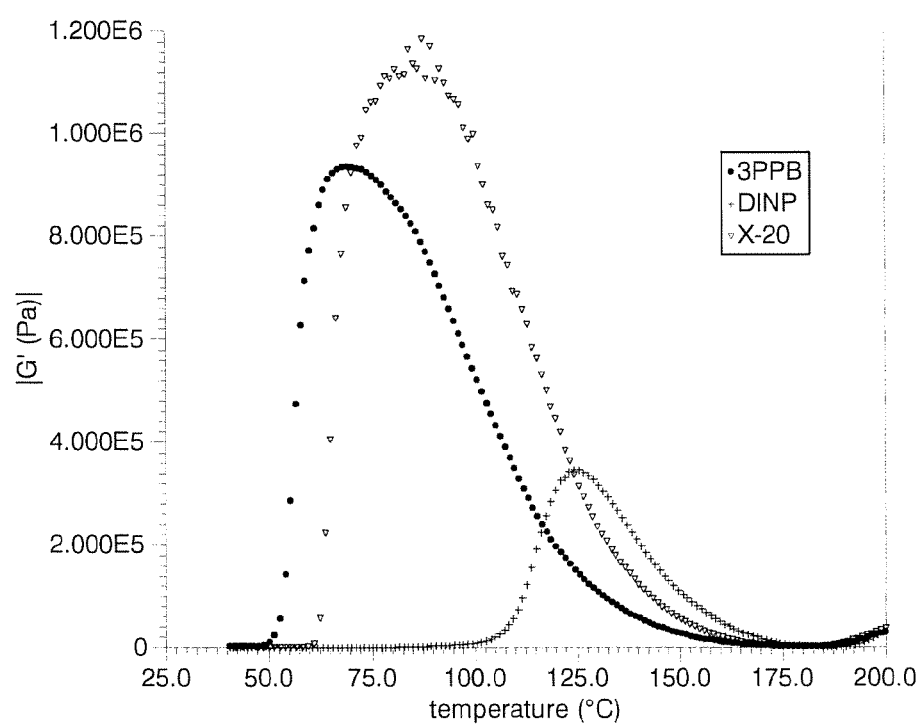
FIG. 2 – Gel/Fusion Curves

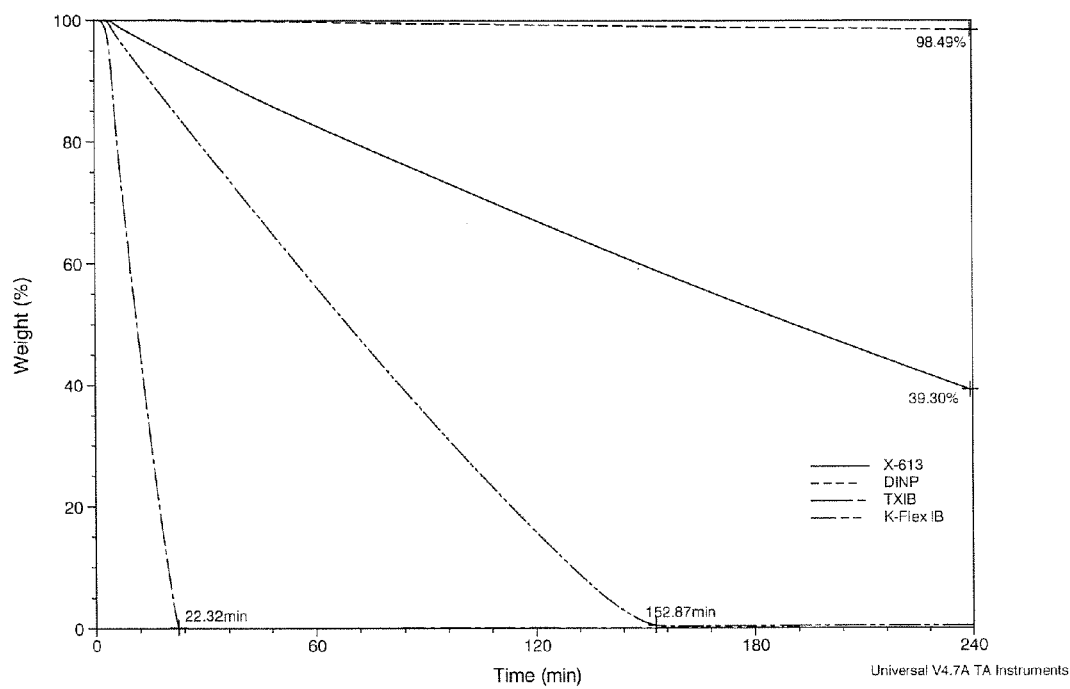
FIG. 3 — Thermogravimetric Data, Neat Plasticizer 110°C
Four Hours

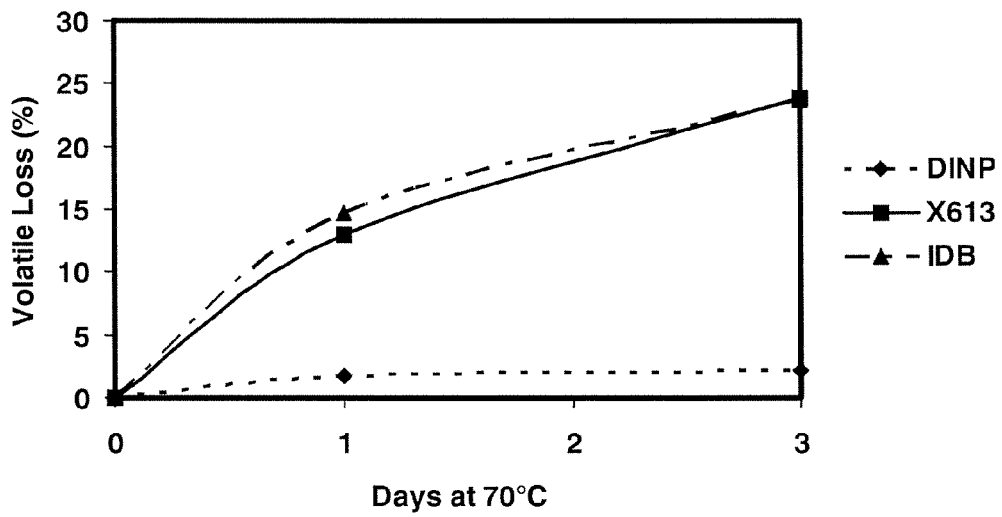
FIG. 4 – Volatility, ASTM D-1203 Extended Test at 70°C
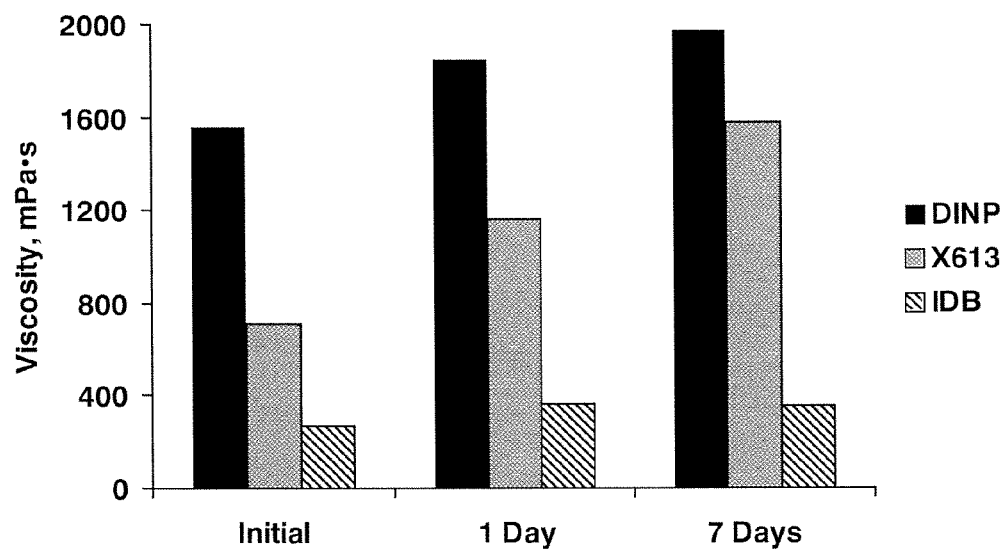
FIG. 5 – Brookfield RVT Viscosity, 20 RPM, 23°C

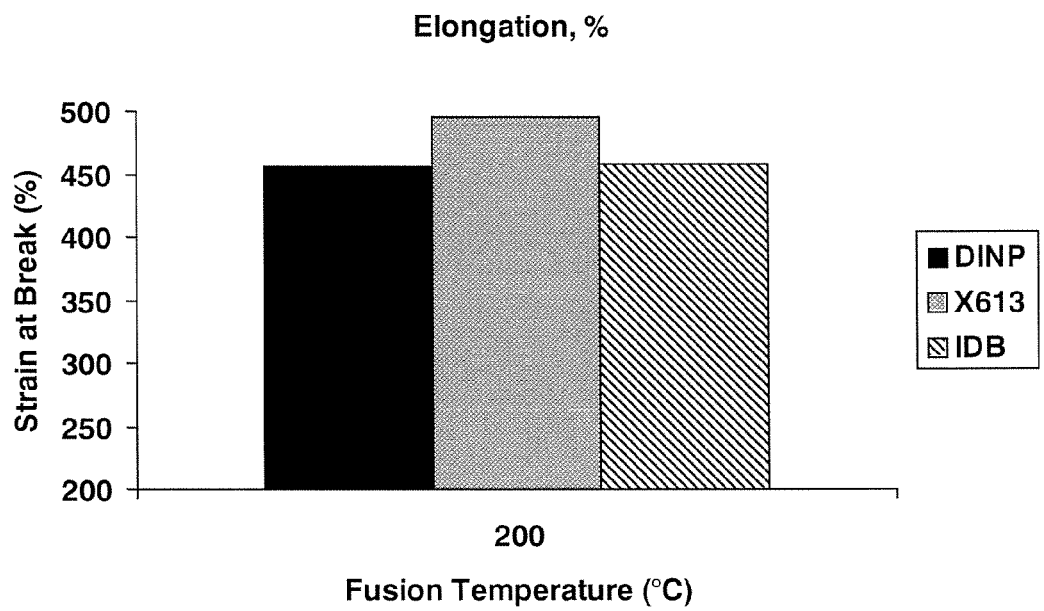
FIG. 7 c
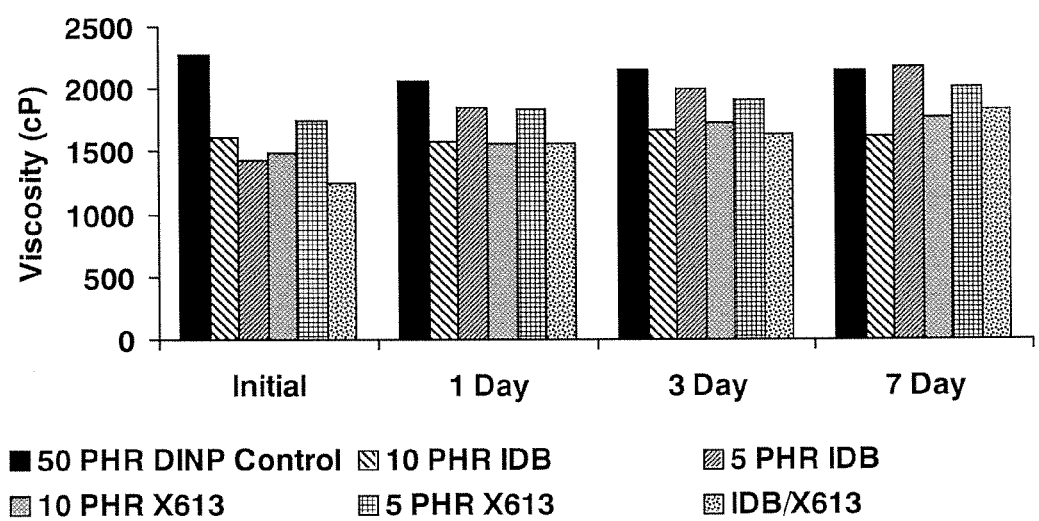
FIG. 8 - Brookfield Viscosity

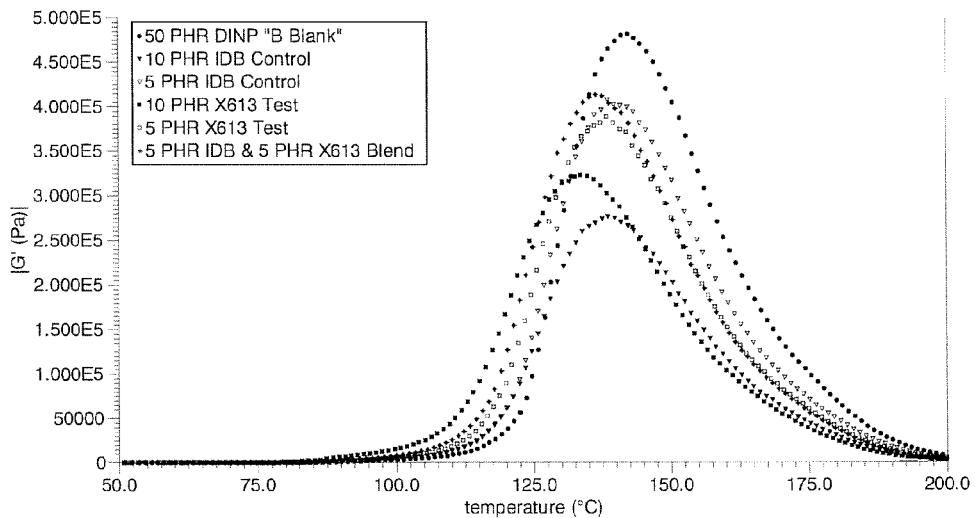
FIG. 9 - Gel/Fusion Curves
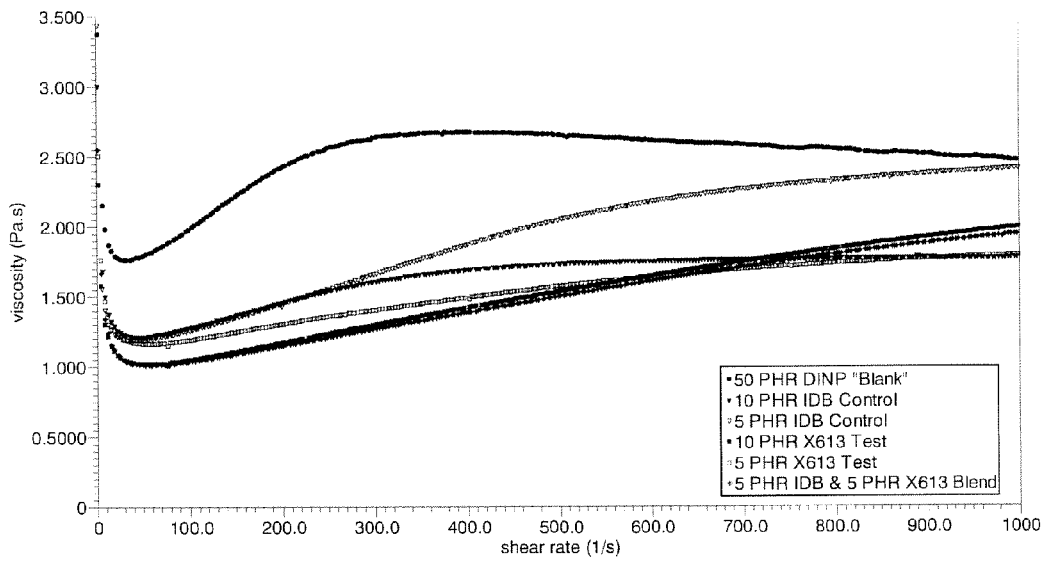
FIG. 10 – Initial Shear

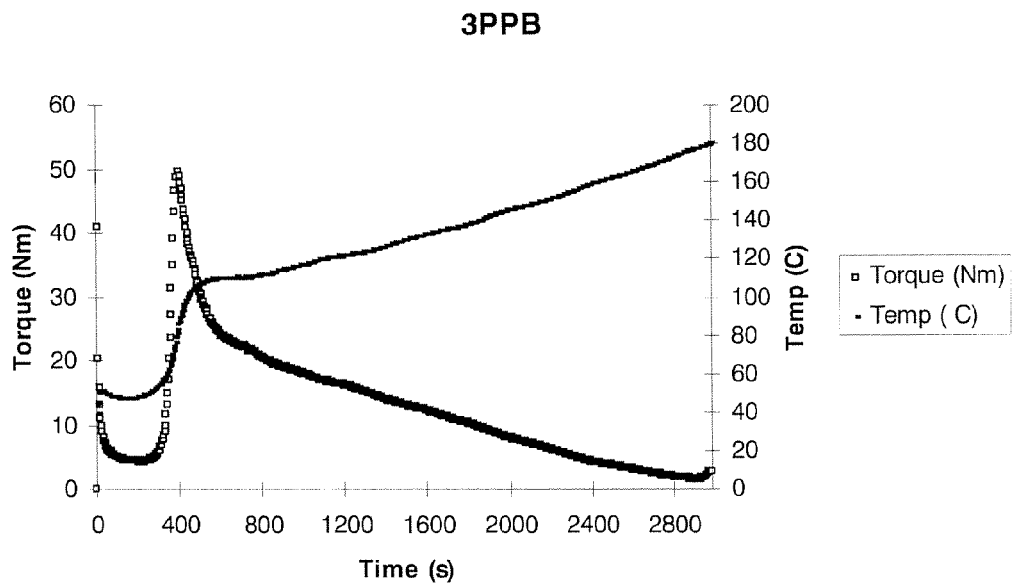
FIG. 11 - Brabender heat rise experiment with X-613
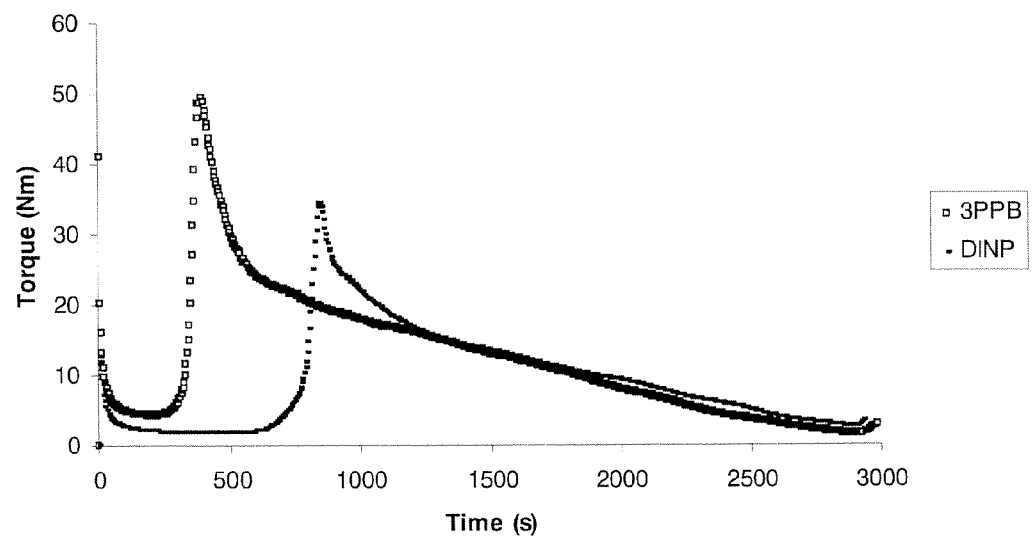
FIG. 12 - Heat rise experiment comparing X-613 to DINP

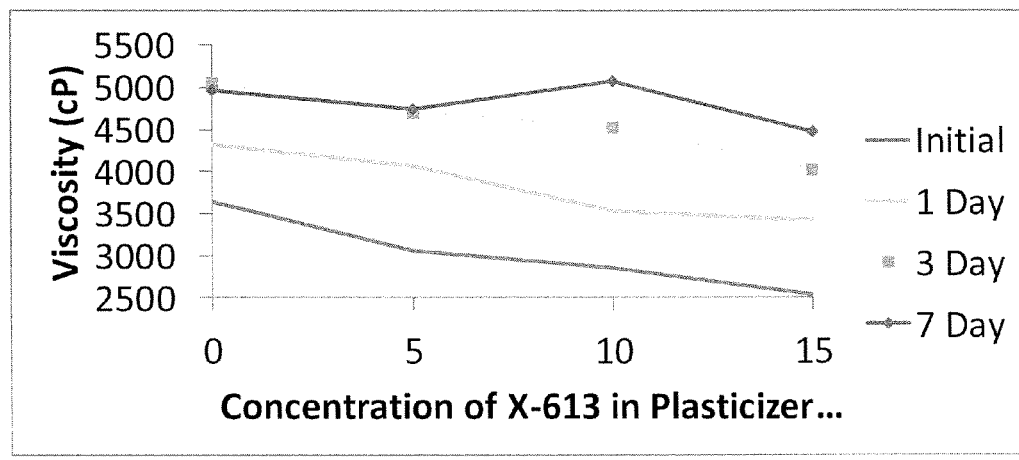
FIG. 13 – Brookfield Viscosities
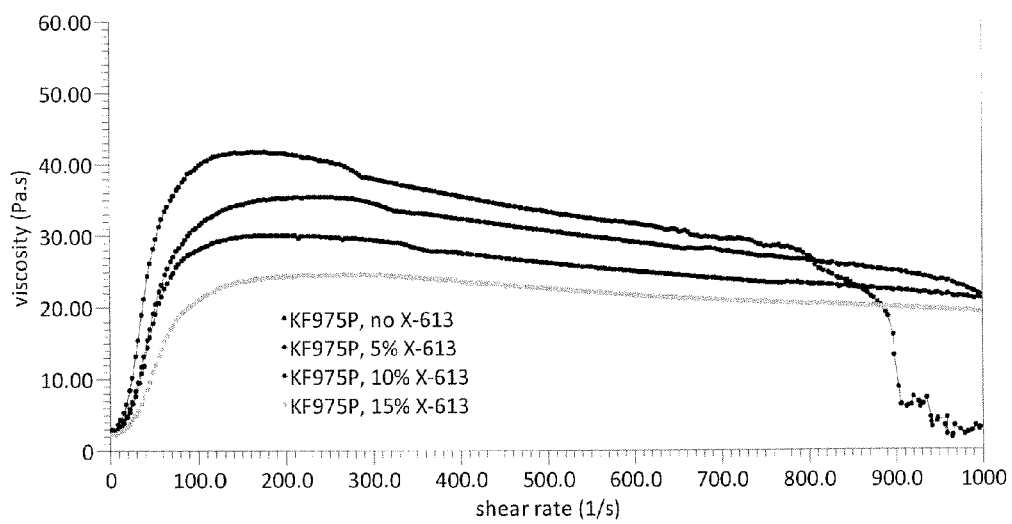
FIG. 14 - Initial Shear

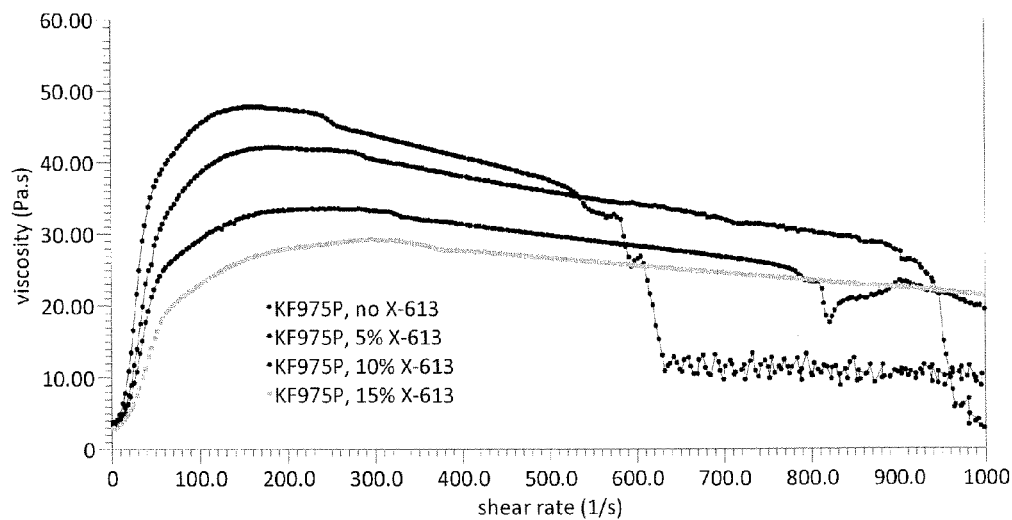
FIG. 15 - One Day Shear
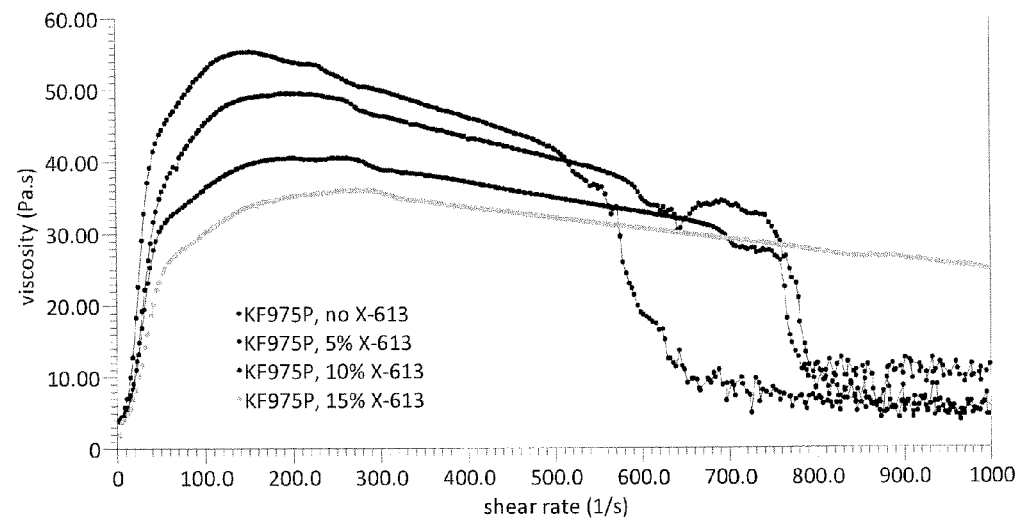
FIG. 16 - Three Day Shear

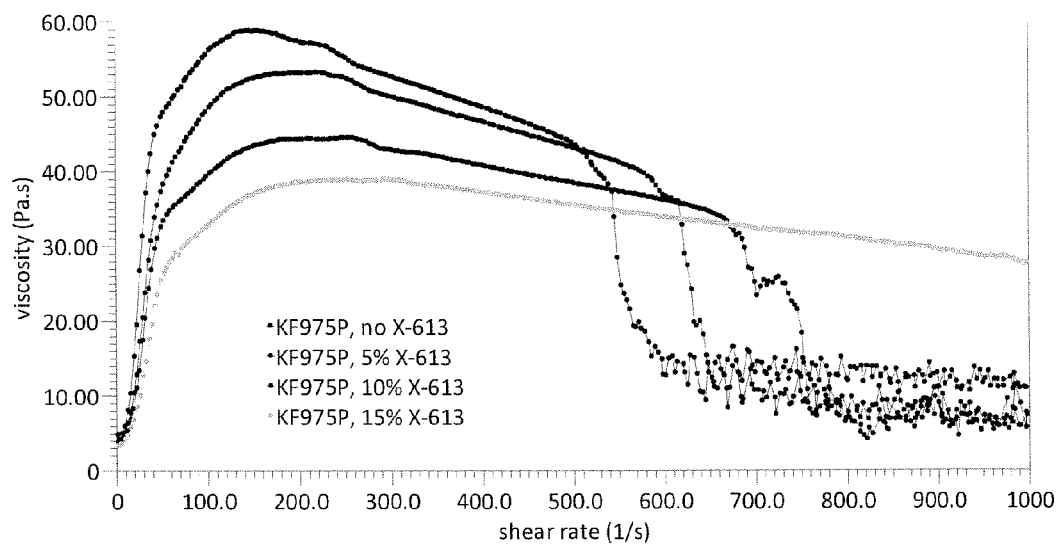
FIG. 17 - Seven Day Shear

GEL/FUSION

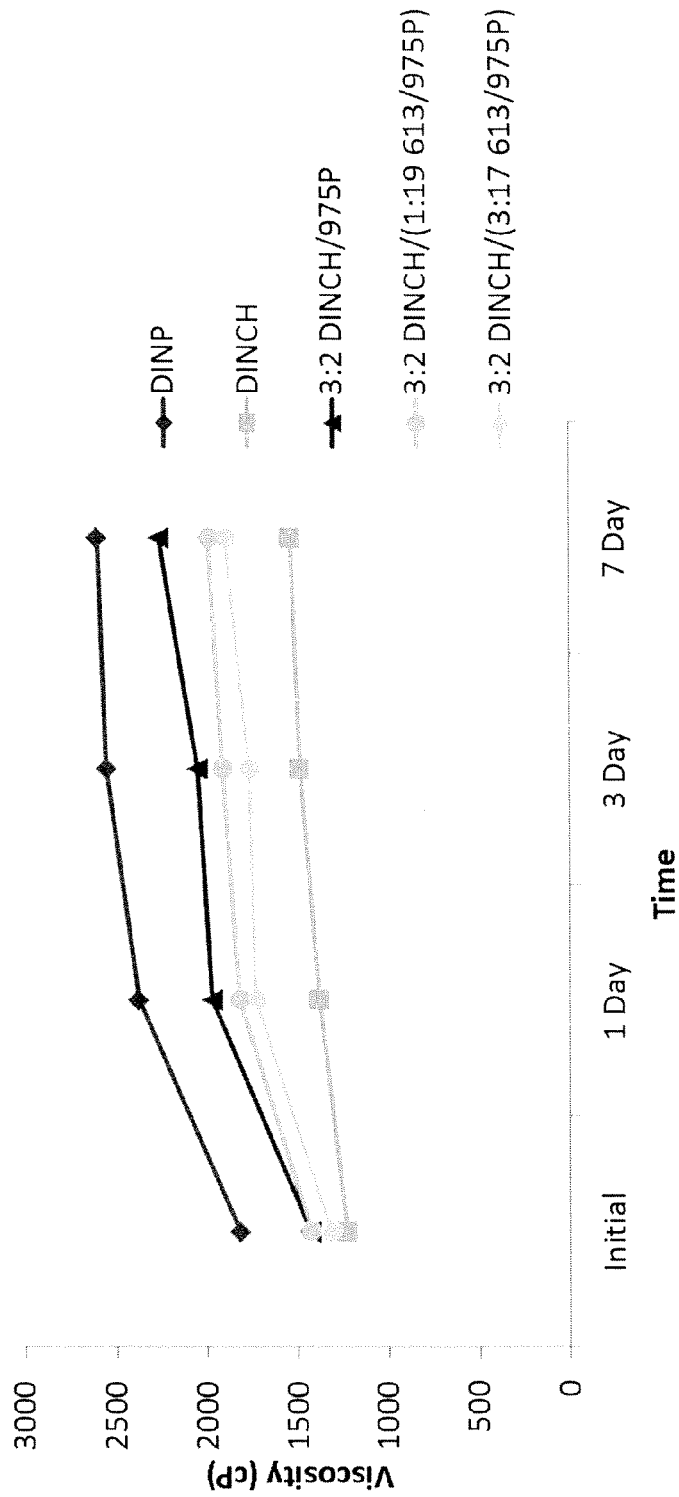
FIG. 19 – Viscosities of DINCH Blends 3:1 DINCH:Benzoate

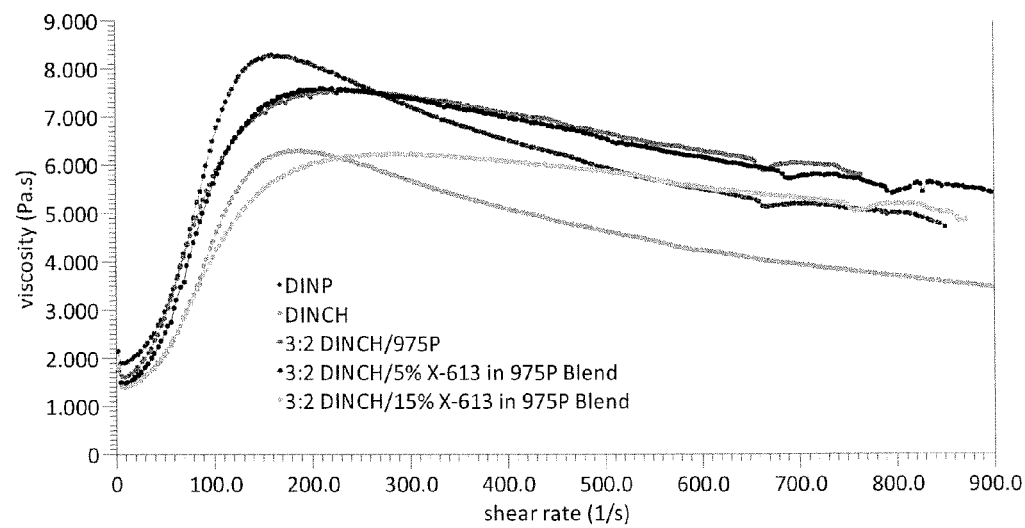
FIG. 20 - Initial Shear, 3:2 DINCH/975P Blends

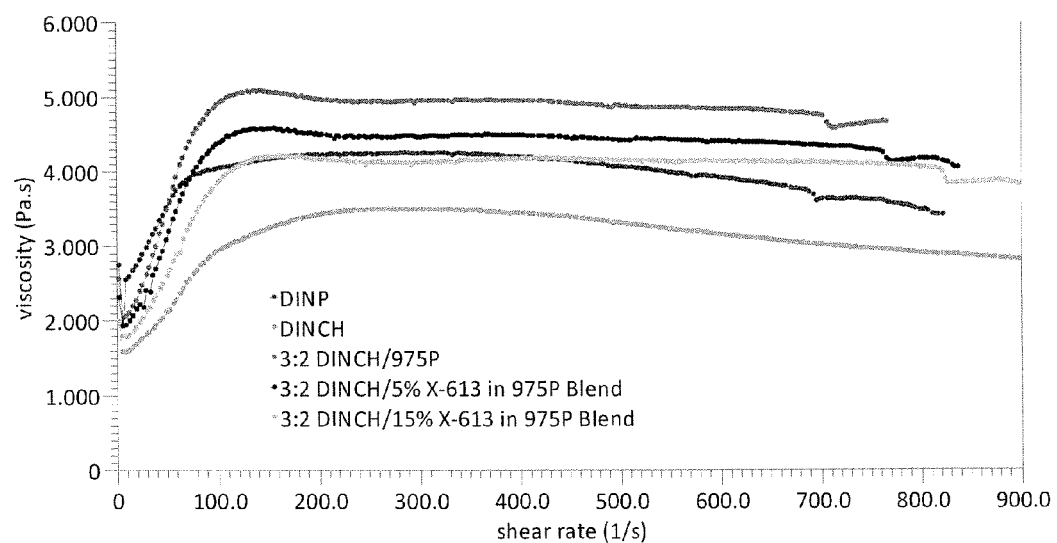
FIG. 21 - 1 Day Shear, 3:2 DINCH/975P Blends

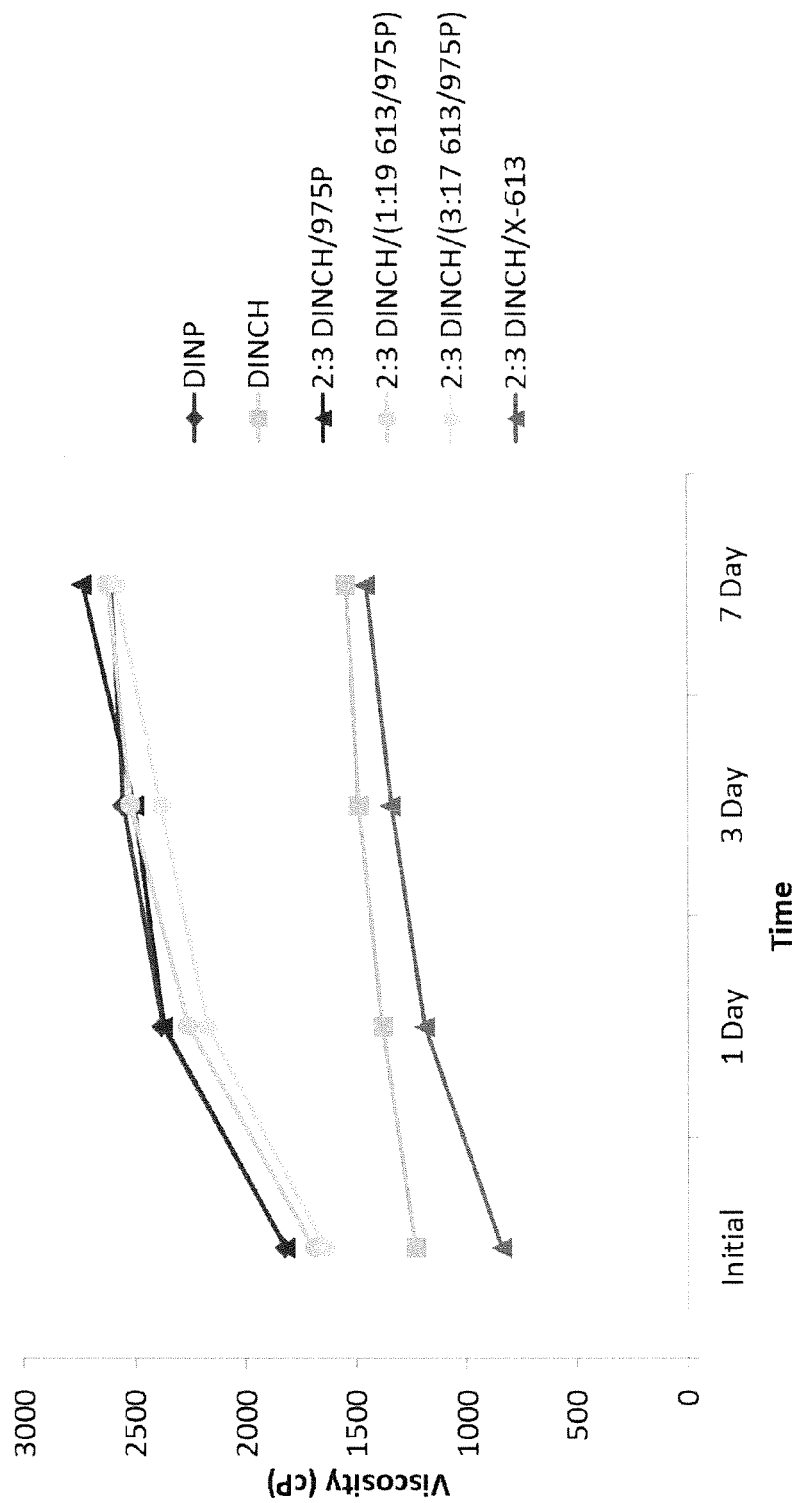
FIG. 22 - Viscosities of DINCH Blends 2:3 DINCH: Benzoate

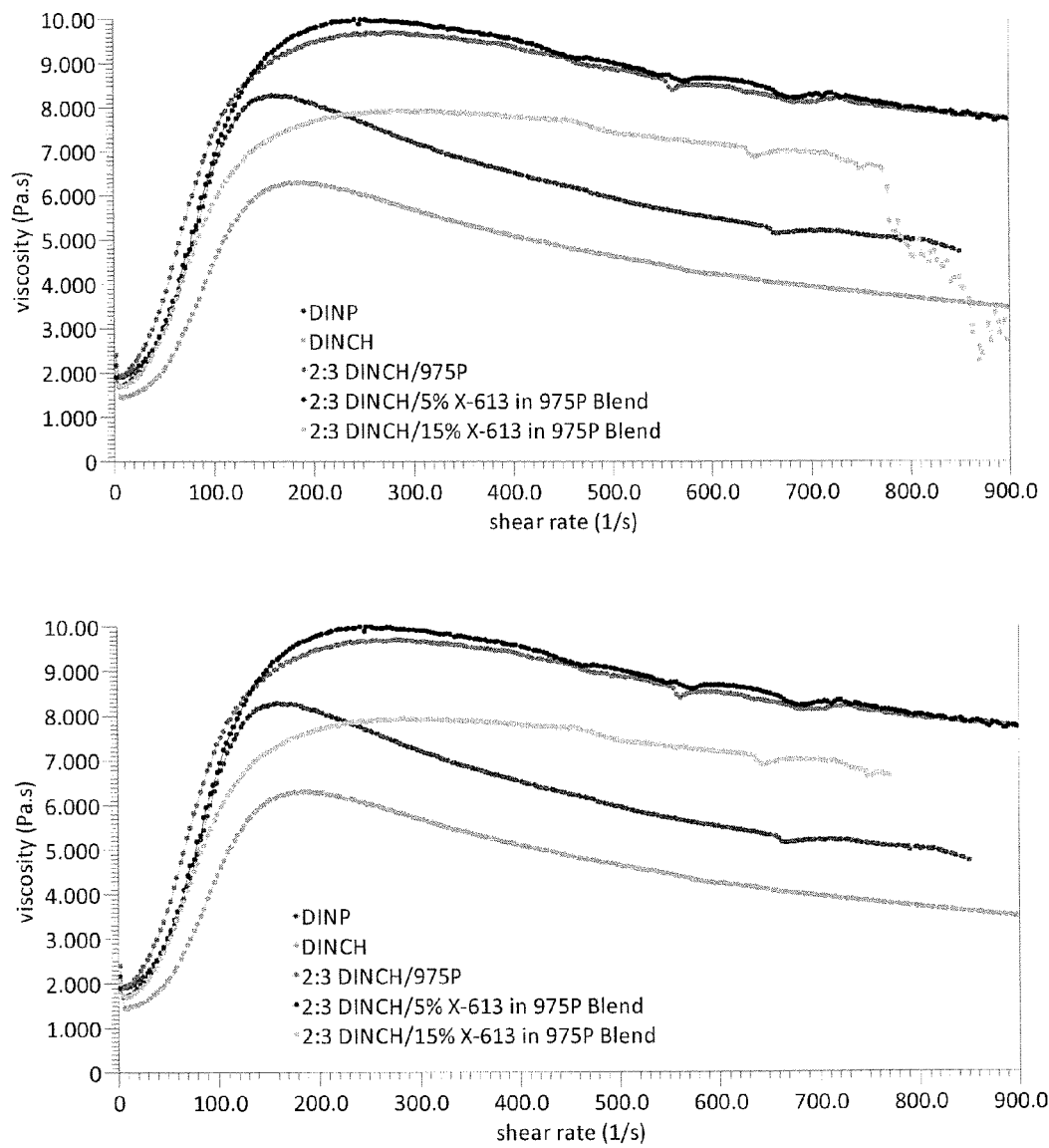
FIG. 23 - Initial Shear, 2:3 DINCH/975P Blends

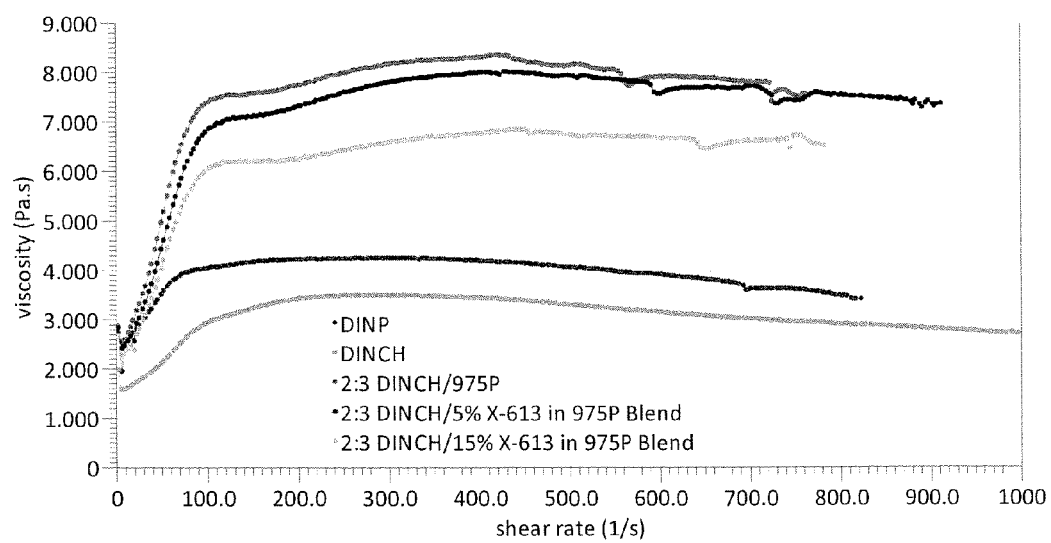
FIG. 24 - 1 Day Shear, 2:3 DINCH/975P Blends

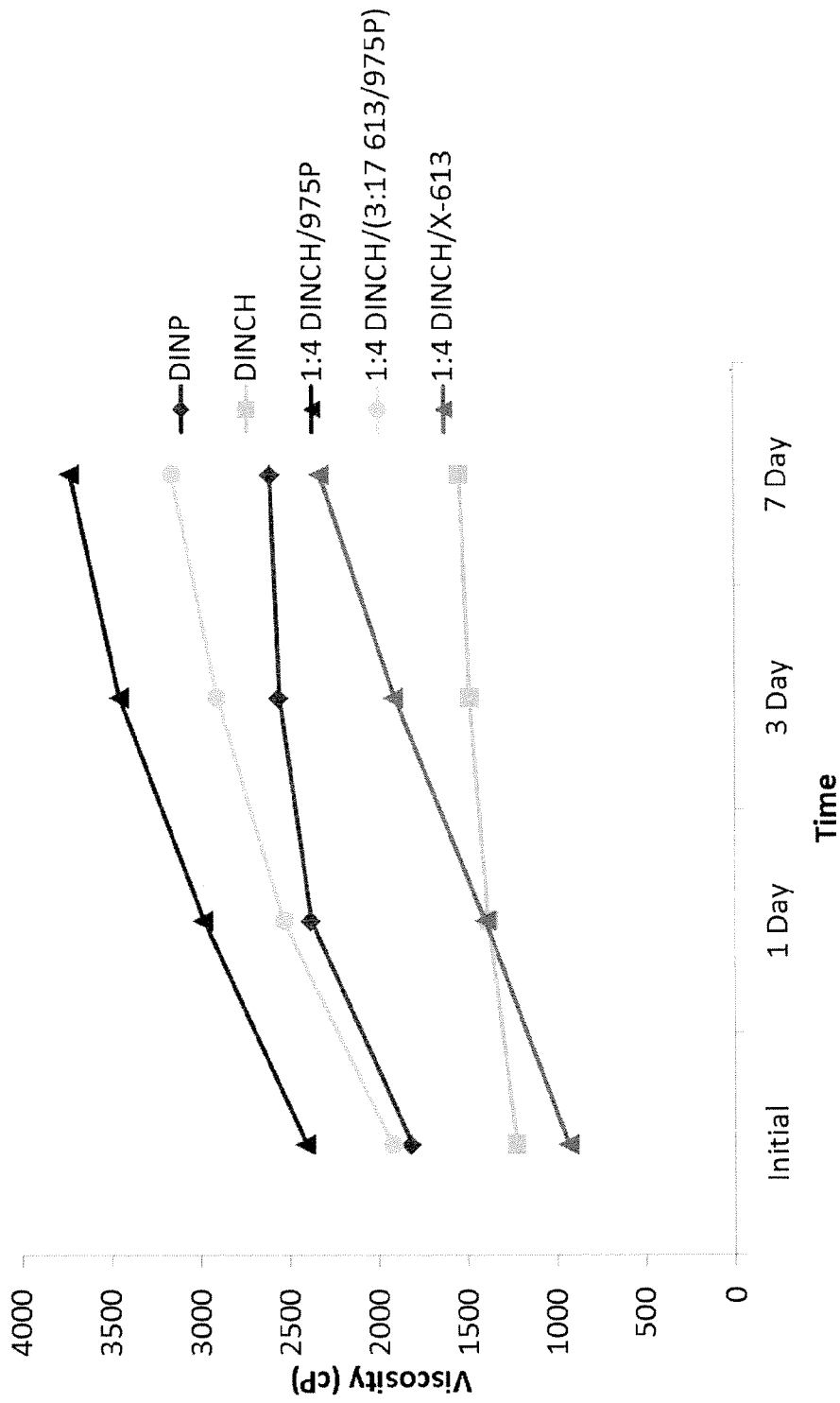
FIG. 25 - Viscosities of DINCH Blends 1:4 DINCH:Benzoate

MONOBENZOATE USEFUL AS A PLASTICIZER IN PLASTISOL COMPOSITIONS

FIELD OF THE INVENTION

This invention is directed to a non-phthalate monobenzoate useful as a plasticizer in a variety of polymer applications, including but not limited to plastisols, adhesives, caulks, architectural coatings, industrial coatings, OEM coatings, paints, inks, overprint varnishes ("OPV's"), other coatings, polishes and the like. In particular, this invention is directed to the use of a monobenzoate ester, 3-phenyl propyl benzoate, to improve the performance properties of polymers in plastisol applications. The inventive monobenzoate has comparable or better rheology, viscosity stability, and processability, among other advantages, over traditional high solvating or specialty plasticizers used in plastisol applications. The invention is also directed to plastisol compositions comprising the inventive monobenzoate and blends of the inventive monobenzoate with other plasticizers for use in plastisol compositions.

BACKGROUND OF THE INVENTION

Plasticizers, as polymer additives, have been known for more than a century. Most high volume plasticizers have been developed in the last seventy years, primarily for use with vinyl and other polymeric substances. Plasticizers are used more than any other type of polymer additives, particularly in polyvinyl chloride (PVC) applications. Hundreds of plasticizers have been produced, but only a few remain having acceptable performance properties when combined with vinyl or other polymeric materials.

General purpose phthalates dominate the volume of plasticizers purchased every year and are most often selected for compounding flexible vinyl.

A typical plasticizer is defined as an organic liquid that will soften a polymer and make it more workable, as long as the polymer and plasticizer are at least partially compatible. The function of a plasticizer in any polymer system requires compatibility. Plasticizers are used to adjust hardness (or softness) of a polymer, impart stain resistance, alter tensile properties (such as strength, elongation or flexibility) and to facilitate processability, as required, for a multitude of applications, including without limitation flexible vinyl applications.

Plasticizers also serve as a vehicle for the dispersion of resin (polymer) particles, such as PVC. The dispersion is initially a two-phase, heterogeneous system. Plasticizers promote the formation of homogeneous systems and polymer fusion occurs upon heating. The higher the solvating power, the lower the temperature at which a homogeneous system is fused, which, in turn, decreases the residence time and increases the speed at which polymeric compositions can be processed into an end product, resulting in a faster, more efficient and economical process.

Plasticizers are available in a wide variety of alternative chemistries and include: 1) general purpose, 2) specialty types and 3) secondary and diluent types, more fully described herein. Plasticizers are also distinguished based on their ability to solvate dispersed solid polymers and/or their gelation and fusion temperatures in plastisols. Gelation and fusion temperatures dictate the speed of production and are influenced by the solvating power of the plasticizer. By way of example only, the gelation and fusion temperatures of a plastisol containing a dibenzoate plasticizer will be lower than a plastisol containing a general purpose phthalate, thus enabling speed of processing in that particular application.

General purpose plasticizers provide an excellent compromise between performance characteristics and economy for most applications. Some examples include: bis (2-ethylhexyl phthalate) (DEHP or DOP), diisononyl phthalate (DINP), dioctyl phthalate (DnOP), diisodecyl phthalate (DIDP), dipropylheptyl phthalate (DPHP), di-2-ethylhexyl terephthalate (DOTP or DEHT), and diisononyl-1,2 cyclohexane dicarboxylate (DIDC, an example of which is BASF's Hexamoll® DINCH®).

Environmental scrutiny has led to the development of "next generation" general purpose non-phthalate plasticizers, such as DOTP and DIDC. Even though DOTP, chemically, is a phthalate, it is not an orthophthalate, the use of which is subject to increasing regulatory pressure. These "next generation" phthalate alternatives are viable; however, they do not always give the performance desired in vinyl compositions, particularly in plastisols (i.e., they have poorer compatibility, slow speed, high gel temperatures, low gel strength). Blends of plasticizers can be used to adjust performance, although there may be some limits to this approach.

Some applications, however, require performance that cannot be achieved by use of a general purpose plasticizer alone. Applications that require better resistance to oils and solvents are one such example. General purpose phthalates are easily extracted by nonpolar solvents such as hexanes, such that alternative plasticizers would be a much better choice. There is also a need for plasticizers that are higher solvators for PVC and other polymer applications. These high solvators should also have a favorable rheology profile.

Specialty type plasticizers were developed, in part, to fulfill the need for high solvators, the most popular being lower molecular weight phthalates. An example of such a plasticizer is butyl benzyl phthalate (BBP), which is often employed as a high solvating plasticizer. Di-n-butyl phthalate (DBP) and diisobutyl phthalate (DIBP) are also useful high solvator, specialty type plasticizers. Examples of non-phthalate, high solvating plasticizers include dibenzoate esters, some citric acid esters, alkyl sulfonic acid esters, and certain phosphates. Dibutyl terephthalate (DBTP) and N-alkyl pyrrolidones have also been proposed as specialty type, high solvator plasticizers. Most high solvating plasticizers are limited in their usefulness due to high viscosity or poor rheology characteristics when incorporated into a plastisol. An ideal plasticizer possesses a good balance between solvation and rheology characteristics.

Benzoate plasticizers include dibenzoates and monobenzoates, such as diethylene glycol dibenzoate (DEGDB) and dipropylene glycol dibenzoate (DPGDB) esters that have been used in a wide variety of polymer applications, including in the vinyl industry. DEGDB is an excellent plasticizer, but due to its high freeze point, blends with DPGDB were also developed to capitalize on the utility and lower cost of DEGDB. Several years ago a blend of DEGDB, DPGDB and triethylene glycol dibenzoate (TEGDB) was introduced as a high solvating dibenzoate blend. More recently, a new dibenzoate triblend was introduced as a low VOC plasticizer/coalescent for use in plastisols, adhesives, architectural paint and coatings, and polishes, among other applications. This triblend, comprising DEGDB, DPGDB and 1,2-propylene glycol dibenzoate (PGDB) in various ratios and sold as K-FLEX® 975P, has been found to be very versatile for a variety of applications, based on its broad range of compatibilities with polymers utilized in the coatings industry (for example, in vinyl acrylic, acrylic and styrene acrylic types) and possesses good solvating properties and low volatility. Its performance properties compare favorably to traditional high solvating phthalate plasticizers as well as traditional benzoate ester plasticizers. Results set forth herein show the triblend to be a high solvating plasticizer that enhances the performance properties of 1,2-cyclohexane dicarboxylate esters, such as 1,2-cyclohexane dicarboxylic acid diisononyl ester, commercially available through a number of manufacturers, one example of which is BASF's Hexamoll® DINCH®.

Monobenzoate esters known to be useful as plasticizers include: isodecyl benzoate, isononyl benzoate, and 2-ethylhexyl benzoate. For example, isodecyl benzoate has been described as a useful coalescent for paint compositions and for use in the preparation of plastisols in U.S. Pat. No. 5,236,987 to Arendt. The use of isodecyl benzoate has also been described in U.S. Pat. No. 7,629,413 to Godwin et al. as a useful secondary plasticizer in combination with phthalate plasticizers to provide lower viscosity and lower volatility in PVC plastisols. The use of 2-ethylhexyl benzoate in a blend with DEGDB and diethylene glycol monobenzoate is described in U.S. Pat. No. 6,689,830 to Arendt et al. The use of isononyl esters of benzoic acid as film-forming agents in compositions such as emulsion paints, mortars, plasters, adhesives, and varnishes is described in U.S. Pat. No. 7,638,568 to Grass et al.

"Half ester" monobenzoates include dipropylene glycol monobenzoate and diethylene glycol monobenzoate, which are byproducts of the production of dibenzoates, but which, most of the time, are not objects of production. Half esters are not known for being high solvators, although they may be used in conjunction therewith. Half esters are also not as useful as dibenzoate plasticizers, because they are less compatible than the corresponding dibenzoate with PVC. However, the half esters are compatible with emulsion polymers, such as acrylic and/or vinyl ester polymers.

Examples of secondary and diluent type plasticizers, used primarily to reduce plastisol viscosity, include those based on castor oil and soybean oil. Isodecyl benzoate, a monobenzoate, is also a useful diluent type plasticizer.

All of the high solvator plasticizers (regardless of type) add value to vinyl compositions that traditional general purpose plasticizers cannot. Traditional general purpose plasticizers have good rheology profiles and are compatible with many polymers, but have poor solvating ability. Moreover, many of the high solvator plasticizers are phthalates, for which safer alternatives are being sought.

There remains a need for non-phthalate, low VOC plasticizers for use in polymeric applications, such as plastisols, as alternatives to traditional diluent plasticizers. These alternatives should be compatible with a wide variety of polymers and have lower VOC content and comparable or better performance properties, when used in polymer applications, such as vinyl, traditionally requiring plasticizers. Non-phthalate, low VOC alternatives are particularly desirable in view of environmental, health and safety issues associated with many of the traditional diluent type plasticizers.

It has been discovered that an entirely different monobenzoate, 3-phenyl propyl benzoate (3-PPB), is a surprisingly effective plasticizer alternative for use in polymeric applications, including but not limited to plastisols, paints and other coatings, adhesives, OPV's and inks. Besides lower VOC's, advantages of this monobenzoate, versus conventional higher VOC diluent plasticizers, such as 2,2,4-trimethyl-1,3-pentanediol diisobutyrate, are its excellent health, safety and environmental profile and handling properties, which are better than most dibenzoates and monobenzoates previously used.

The inventive monobenzoate, 3-PPB, has been found to be an excellent blending plasticizer in combination with traditional plasticizers, such as dibenzoates, phthalates, 1,2-cyclohexane dicarboxylate esters, and the like, resulting in plastisols that are lower in viscosity, but having better gel/fusion characteristics than that obtained with blends of traditional plasticizers. In particular, the inventive monobenzoate achieves excellent performance benefits when used alone in a blend with diisononyl-1,2-cyclohexane dicarboxylate or other general purpose plasticizers such as DOTP and DINP. It also achieves excellent performance benefits when combined with a unique dibenzoate triblend and diisononyl-1,2-cyclohexane dicarboxylate. In addition, results achieved show that the unique triblend of dibenzoates alone, without the inventive monobenzoate, also achieves excellent performance benefits when blended with diisononyl-1,2-cyclohexane dicarboxylate.

The monobenzoate, 3-PPB, has been used in the past in flavoring and fragrance applications, but not in polymeric applications of the type discussed herein. It continues to be used in flavoring and fragrance applications. It has also been used as a solubilizer for certain active or functional organic compounds in personal care products, such as topical sunscreens, as described in U.S. Patent Publication 2005/0152858.

While this invention is focused on the use of the inventive plasticizer and/or blends thereof in plastisol compositions, other applications include use in a variety of coatings, including without limitation overprint varnishes, polishes, inks, paints, adhesives, sealants, and caulk, which are the subject of co-pending applications.

It is an object of the invention to provide a plasticizer having excellent compatibility with a wide variety of polymers and lower VOC content than traditional diluent type plasticizers used to control plastisol viscosities, for use alone or in blends with other plasticizers, in plastisols and other polymeric applications where plasticizers are traditionally required.

It is a further object of the invention to provide a non-phthalate alternative plasticizer for use as a primary or secondary plasticizer in PVC applications.

It is another object of the invention to provide a non-phthalate plasticizer or plasticizer blend that has high solvating properties and a good rheology profile, which is useful to improve the compatibility and processability of poor solvating plasticizers, while minimizing the attendant disadvantages of high viscosity and poor rheology associated with the use of high solvating plasticizers.

Still a further object of the invention is to provide plasticizer blends comprising the inventive monobenzoate of the invention with general purpose and other plasticizers, including but not limited to a blend of the inventive monobenzoate alone with DOTP, DINP, diisononyl-1,2-cyclohexane dicarboxylate, a unique dibenzoate triblend, or mixtures thereof.

Yet another object of the invention is to provide a plastisol formulation utilizing a non-phthalate plasticizer, 3-PPB, which allows faster processing and economic efficiencies to be achieved and provides comparable or better tensile strength properties over traditional diluent type plasticizers.

Other objects of the invention will be apparent from the description herein.

SUMMARY OF THE INVENTION

This invention is directed to the use of a non-phthalate monobenzoate ester useful as a plasticizer for polymeric dispersions, such as plastisols. The inventive monobenzoate comprises 3-phenyl propyl benzoate (3-PPB), a component not previously known or used as a plasticizer for plastisol compositions.

In one embodiment, the invention is a plasticizer comprising 3-PPB useful to provide improved solvation and rheology in polymeric applications such as plastisols, melt compounding, injection molding, extrusion and calendaring, among others.

In a second embodiment, the invention is a plastisol composition comprising the inventive monobenzoate plasticizer, including but not limited to PVC and acrylics.

In a third embodiment, the invention is a blend of 3-PPB with traditional plasticizers, including but not limited to one or more of various phthalate esters, phosphate esters, adipate, azelate, oleate, succinate and sebacate compounds, citrates, trimellitates, terephthalate esters, such as DOTP, 1,2-cyclohexane dicarboxylate esters, epoxy plasticizers, fatty acid esters, glycol derivatives, sulfonamides, sulfonic acid esters, benzoates, bioplasticizers, such as PG disoyate and PG monosoyate, chloroparaffins, polyesters, and various other hydrocarbons and hydrocarbon derivatives that are often utilized as secondary plasticizers, such as epoxidized soybean oil, and the like.

In a fourth embodiment, the invention is a blend of 3-PPB with solid plasticizers.

In a fifth embodiment, the invention is a blend of a dibenzoate triblend (comprising DEGDB, DPGDB, and PGDB) with 1,2-cyclohexane dicarboxylate ester plasticizers.

In still other embodiments, the invention relates to the use of the inventive plasticizer in compositions used in applications such as resilient flooring, toys, gloves, wall covering, leather, textiles and the like.

Use of 3-PPB in the same or similar amounts as traditional plasticizers results in a lower VOC content compared to other diluent plasticizers, such as 2,2,4-trimethyl-1,3-pentanediol diisobutyrate or isodecyl benzoate, and comparable or better performance and handling properties than that achieved with traditional plasticizers.

BRIEF DESCRIPTION OF THE DRAWINGS

FIG. 1 shows initial viscosity data obtained for the inventive monobenzoate as compared to a dibenzoate triblend and a general purpose phthalate plasticizer, DINP.

FIG. 2 shows the gel/fusion curves for the inventive monobenzoate, a dibenzoate triblend and a general purpose phthalate plasticizer, DINP.

FIG. 3 shows thermogravimetric data for neat plasticizers, including the inventive monobenzoate, DINP, IDB and Eastman's TXIB™.

FIG. 4 reflects volatility data from the ASTM D-1203 Extended Test at 70° C. for the inventive monobenzoate, DINP, and IDB.

FIG. 5 reflects initial, one-day and seven-day viscosities obtained using Brookfield RVT Viscosity, 20 RPM, 23° C. for the inventive monobenzoate, DINP and IDB.

FIG. 6($b$) shows gel fusion curves for a basic plastisol composition comprising the inventive monobenzoate as compared to a dibenzoate triblend (X20, K-FLEX® 975P), BBP, DOTP, DINP and IDB.

FIG. 8 shows Brookfield viscosities obtained for various plastisol formulations at initial, 1 day, 3 day and 7 day as compared to a control formulation comprising 50 phr DINP.

FIG. 9 shows gel/fusion curves for various plastisol formulations as compared to a control formulation comprising 50 phr DINP.

FIG. 10 shows initial shear data for various plastisol formulations as compared to a control formulation comprising 50 phr DINP.

FIG. 11 shows data from the Brabender heat rise experiment for the inventive monobenzoate.

FIG. 12 shows heat rise experiment data comparing the inventive monobenzoate to DINP.

FIG. 13 shows Brookfield viscosities obtained initially and at 1 day, 3 day and 7 day for plastisol formulations having various concentrations of the inventive monobenzoate (shown as X-613) in combination with a dibenzoate triblend.

FIGS. 14, 15, 16 and 17 show initial, 1 day, 3 day and 7 day shear results obtained for a dibenzoate triblend blend with no and various concentrations (wt. %) of the inventive monobenzoate.

FIG. 19 shows viscosities obtained for DINP, DINCH®, and various 3:2 DINCH®:benzoate blends.

FIGS. 20 and 21 show initial and 1 day shear results obtained for DINP, DINCH® and various 3:2 DINCH®:benzoate blends.

FIG. 22 shows viscosities obtained for DINP, DINCH® and various 2:3 DINCH®:benzoate blends.

FIGS. 23 and 24 show initial and 1 day shear results, respectively, obtained for DINP, DINCH®, and various 2:3 DINCH®:benzoate blends.

FIG. 25 shows viscosities obtained for DINP, DINCH®, and various 1:4 DINCH®:benzoate blends.

DETAILED DESCRIPTION OF THE INVENTION

Figure 6:
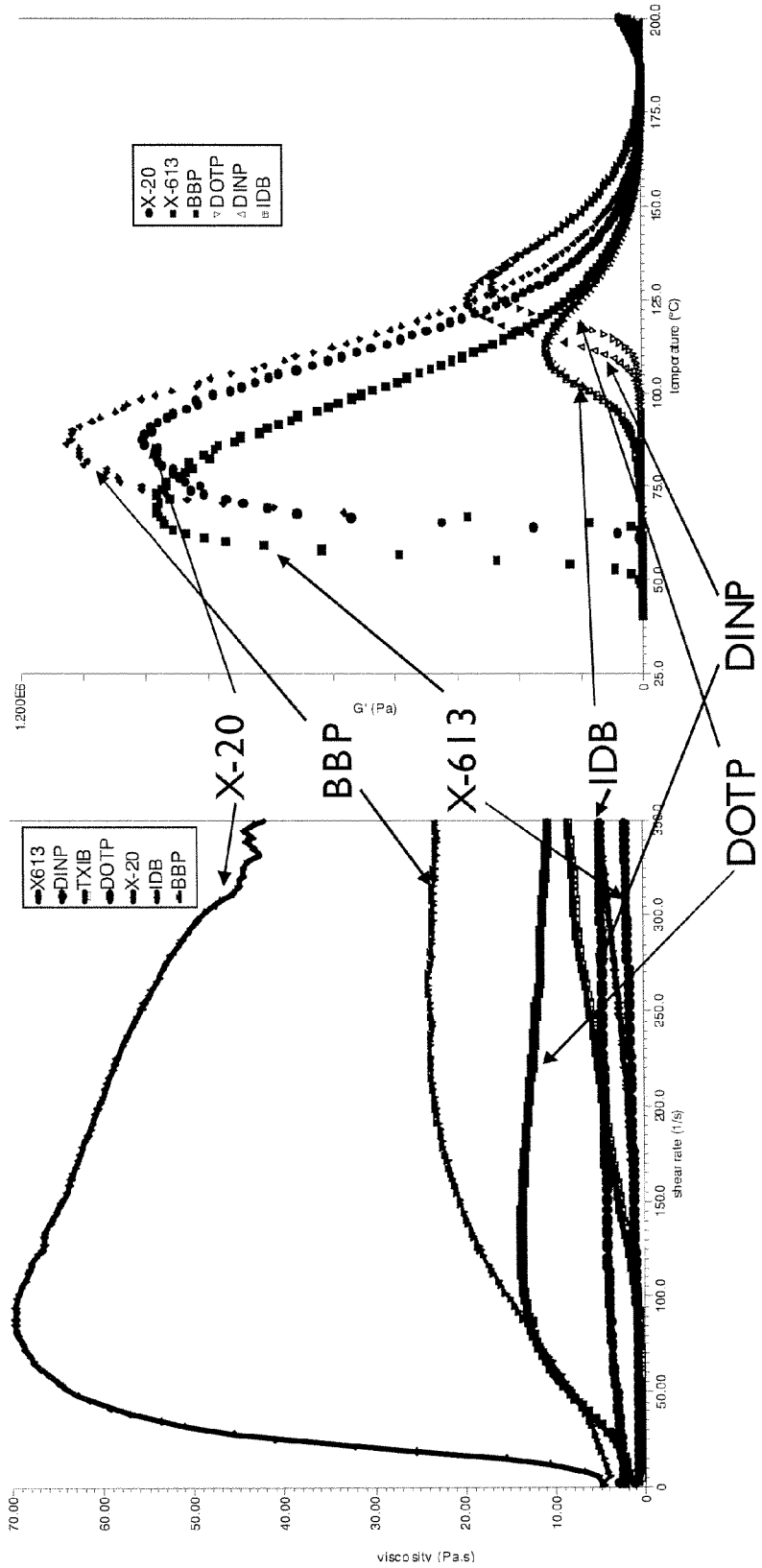
FIG. 6($a$) shows rheology data: 1 day scan obtained for a basic plastisol composition comprising the inventive monobenzoate as compared to a dibenzoate triblend (X20, K-FLEX® 975P), BBP, DOTP, DINP and IDB.

The present invention is directed to a monobenzoate plasticizer useful for a variety of applications as a primary or secondary plasticizer, including but not limited to plastisols. The monobenzoate plasticizer comprises a unique monobenzoate, 3-phenyl propyl benzoate (3-PPB), not previously known or used as a plasticizer in polymeric applications. The present invention is also directed to a dibenzoate triblend that is useful in blends with other plasticizers, in particular 1,2-cyclohexane dicarboxylate esters, to improve performance properties.

A preferred embodiment of the invention is 3-PPB, alone or in a blend with other plasticizers, in combination with a polymeric dispersion. Another preferred embodiment is 3-PPB blended with a dibenzoate triblend to improve the performance properties of 1,2-cyclohexane dicarboxylate ester plasticizers in a polymeric dispersion. The inventive monobenzoate plasticizer can generally be utilized as a primary plasticizer or a secondary plasticizer in blends with other plasticizers in numerous polymeric dispersions, often as a substitute or alternative for conventional diluent plasticizers having a higher VOC content or plasticizers that do not provide advantageous solvation and rheology.

The present invention is not restricted to any particular polymer, although it may be described in terms of vinyl polymers. Any of the known polymers that can be formulated into a plastisol, melt compound, injection molding, extrusion, or calendaring polymer can be used in combination with novel monobenzoate to prepare a low VOC content composition in accordance with the present invention.

In particular, the plasticizer(s) of the present invention can generally be utilized with numerous thermoplastic, thermoset, or elastomeric polymers often as an alternative for conventional plasticizers. By way of example, the inventive monobenzoate and/or blends thereof may be used to prepare a reduced viscosity PVC, PVC copolymer or acrylic-based plastisol in accordance with the present invention.

Acrylic polymer compositions for various applications may also be used with the plasticizers of the invention and include various polyalkyl methacrylates, such as methyl methacrylate, ethyl methacrylate, butyl methacrylate, cyclohexyl methacrylate, or allyl methacrylate; or various aromatic methacrylates, such as benzyl methacrylate; or various alkyl acrylates, such as methyl acrylate, ethyl acrylate, butyl acrylate, or 2-ethylhexyl acrylate; or various acrylic acids, such as methacrylic acid and styrenated acrylics.

In addition to PVC and acrylic plastisols, the inventive monobenzoate and/or blends thereof set forth herein may be useful in other polymeric compositions, including but not limited to various vinyl polymers comprising polyvinyl chloride and copolymers thereof, vinyl acetate, vinylidene chloride, diethyl fumarate, diethyl maleate, or polyvinyl butyral; various polyurethanes and copolymers thereof; various polysulfides; cellulose nitrate; polyvinyl acetate and copolymers thereof; and various polyacrylates and copolymers thereof.

Other polymers for which the inventive monobenzoate and/or blends thereof may be useful as a plasticizer include epoxies, phenol-formaldehyde types; melamines; and the like. Still other polymers useful with the plasticizer(s) of the invention will be evident to one skilled in the art.

For purposes of the invention, "plastisol" means a liquid polymer composition comprising a particulate form of at least one non-crosslinked organic polymer dispersed in a liquid phase comprising a plasticizer for the polymer. As used in the invention, "plastisol" also means and includes an "organosol" that is a plastisol in which solvents, such as liquid hydrocarbons, ketones, or other organic liquids, are used in amounts greater than about 5 wt. % to control viscosity and other properties of a plastisol.

As used herein, "high solvator" or "high solvating" is a term that describes the plasticizer's efficiency in penetrating, thickening, and gelling dispersed polymer particles before full physical properties are developed. All of the plasticizer is absorbed into the PVC of a plastisol at lower temperatures than general purpose plasticizers, thus facilitating a faster formation of a homogenous phase.

The novel monobenzoate and other plasticizer blends of the invention may be used as low VOC substitutes for other diluent plasticizers, such as isodecyl benzoate, or as an alternative plasticizer for various traditional polymer dispersions, including without limitation vinyl applications.

The total amount of the inventive monobenzoate and/or other plasticizer blends of the invention that are used in any particular polymeric dispersion would depend on the particular polymer, the characteristics of the polymer and other components, the process, the application or use and the results desired. The total amount of the inventive monobenzoate, 3-PPB, would range broadly depending on the application, generally from about 1 to about 300, desirably from about 10 to about 100, and preferably from about 20 to about 80 parts by weight for every 100 total parts by weight of the one or more thermoplastic, thermoset, or elastomeric polymers, including without limitation those identified above. For 3-PPB, a particularly preferred embodiment for a plastisol would range from about 5 to about 20 parts by weight of 3-PPB for every 100 total parts by weight of the plasticizer, resulting in a total plasticizer content ranging from 30 to 120 phr. Amounts of 3-PPB ranging from 5-10 phr of the total plasticizer content are particularly useful as a viscosity lowering, high solvator in plastisol formulations.

Useful amounts of the plasticizers of the invention are set forth in the examples. It is expected that one skilled in the art would be able to arrive at additional acceptable amounts based on the intended use and desired performance in the particular polymeric application.

The inventive monobenzoate may be, but is not required to be, blended with various other conventional plasticizers to enhance or augment properties of polymeric compositions, including but not limited to improving compatibility and processability in a plastisol and enhancing solvating power. Conventional plasticizers have been described herein and include, but are not limited to, various phthalate esters, phosphate esters, adipate, azelate, oleate, succinate and sebacate compounds, citrates, trimellitates, terephthalate esters such as DOTP, 1,2-cyclohexane dicarboxylate esters, epoxy plasticizers, fatty acid esters, glycol derivatives, sulfonamides, sulfonic acid esters, benzoates, bioplasticizers, such as PG disoyate and PG monosoyate, chloroparaffins, polyesters, and various other hydrocarbons and hydrocarbon derivatives that are often utilized as secondary plasticizers, such as epoxidized soybean oil, and the like. Particularly useful blends include 3-PPB in combination with DOTP, DINP or diisononyl-1,2-cyclohexane dicarboxylate. Another useful blend includes 3-PPB in combination with a unique dibenzoate triblend (comprising DEGDB, DPGDB and 1,2-propylene glycol dibenzoate, further blended with diisononyl-1,2-cyclohexane dicarboxylate. Still another useful blend includes the dibenzoate triblend alone with diisononyl-1,2-cyclohexane dicarboxylate.

Monobenzoates, such as isononyl benzoate, isodecyl benzoate, and 2-ethylhexyl benzoate, as well as 2,2,4-trimethyl-1,3-pentanediol diisobutyrate (TXIB™, an Eastman trademark) can also be blended with the inventive monobenzoate, or the 3-PPB can replace any of these with the advantage that less is needed to achieve solvation and maintain processable viscosity and rheology.

The inventive monobenzoate may also be blended with solid plasticizers such as sucrose benzoate, dicyclohexyl phthalate, triphenyl phosphate, glycerol tribenzoate, 1,4-cyclohexane dimethanol (CHDM) dibenzoate, pentaerythritol tetrabenzoate, and alkyl glycol esters.

Other suitable blending plasticizers will be known to one skilled in the art.

The plasticizers of the invention may also be combined with or include various amounts of conventional additives such as oils, diluents, antioxidants, surfactants, heat stabilizers, flame retardants, surfactants, blending resins, fillers, waxes, solvents and the like, depending on the particular application or polymeric dispersion. Additives amounts can generally vary widely and often range from about 0.1 to about 100 parts by weight for every 100 parts by weight of the plastisol composition.

For vinyl applications, there are two different methods of fusing: plastisols and melt compounding. A plastisol is a liquid dispersion of PVC (or other polymer) in plasticizer, which may be heated as a spread coating, fused in slush molding, dip molding or rotationally molded. The plastisols of the invention may be compounded by simple mixing or blending, followed by de-aerating in most instances. Melt compounding is a process that uses heat and pressure while mixing to fuse vinyl (or other polymer). Its overall purpose is to combine the polymer and plasticizer into a homogeneous material which can be formed through a calendar, extruder or injection mold.

Exemplary formulations for simple basic starting plastisols and melt compounds are set forth in the examples; however, the invention is not limited to these formulations.

The inventive monobenzoate and/or blends thereof provide a lower VOC content alternative over secondary and diluent type plasticizers and, depending on the application, provides comparable or better compatibility, viscosity stability, and rheology, among other advantages. In many instances, the inventive monobenzoate outperforms industry standard plasticizers, including traditional and newer dibenzoate blends. Many traditional plasticizers have either high solvating properties or low viscosity, but not both. Surprisingly, the inventive monobenzoate strikes a good balance between high solvating power, better rheology and lower viscosity, even when used alone. In blends, it lowers the viscosity and improves the rheology profile of newer high solvating dibenzoate blends.

There are a large variety of uses for the plastisols and melt compounds of the invention, including but not limited to resilient flooring, wear layers, wall coverings, toys, gloves, and leather and textile applications. Other uses will be known to one skilled in the art.

The invention is further described by the examples set forth herein.

EXAMPLES

Experimental Methodology
Plastisol and Vinyl Preparation:

The plastisols were prepared in a Hobart Model N-50 mixer. A ten minute mix at speed one (1) was used. A high speed disperser was also used to prepare other plastisols evaluated employing a ten minute mix at 1000 RPM's. All of the plastisols were degassed at 1 mmHg until as air free as possible.

The vinyl for the basic screen was fused in a closed mold at a thickness of 1.2 mm at 177° C. for 15 minutes in a Blue M oven.

Tests/Evaluations

The goal was to determine the basic performance parameters of the inventive plasticizer versus known or standard and currently available plasticizers. Tests demonstrating efficiency (Shore A and tensile properties), permanence (extraction and volatility) and processability (viscosity, viscosity stability, rheology, and gel/fusion) were utilized. Unless otherwise indicated in specific examples, the general tests and/or methodologies described below were used. The tests and methods are known to one skilled in the art.

Viscosity and Rheology: Low shear—Viscosity measurements were made using a Brookfield RVT at 20 RPM's for 10 revolutions at 23±2° C. ASTM D1823. High shear—TA AR2000ex used. Parallel plates were set at appropriate gap (350 microns). Shear to 1000 sec$^{-1}$. Viscosity Response: Both the initial and 24 hour viscosities were measured.

Gel/Fusion: TA AR2000ex in oscillatory mode. Parallel plates were set at appropriate gap (600 microns). The test temperature was started at 40° C. and heated at a rate of 5° C./minute to 220° C.

Efficiency: Shore A—ASTM D2240; Tensile—ASTM D638, type IV die, 50.8 cm/minute pull rate.

Permanence: Volatility—EPA 24, ASTM D2369 volatility, 110° C. for one hour. A TGA isothermal for one hour under air at 110° C. was also employed. ASTM D1203 was also utilized as an extended test for volatile loss.

Example 1

Basic Plastisol Evaluations—Processability

The following examples show the efficacy of the inventive monobenzoate with a basic starting plastisol formulation described below:

| Material | PHR |
|---|---|
| Dispersion Resin, K76, Geon 121 A | 100 |
| Plasticizer | 70 |
| Ca/Zn stabilizer, Mark 1221 | 3 |

The inventive monobenzoate was compared to K-FLEX® 975P (a new dibenzoate triblend (comprising 20 wt. % 1,2-propylene glycol dibenzoate and 80 wt. % of an 80/20 DEG/DPG dibenzoate blend) and DINP. FIG. 1 shows initial viscosity data obtained for the inventive monobenzoate, which compares favorably to a general purpose phthalate and reflects better rheology than the new dibenzoate triblend.

Table 1, below, reflects gel fusion values obtained for 3-PPB, 975 P (shown as X-20 in FIG. 1), and DINP (a general purpose phthalate plasticizer).

TABLE 1

| Plasticizer | Initial Inflection Temp (° C.) | G' Maximum Temp (° C.) | G' Maximum Modulus (Pa) | G' × G" Temp (° C.) |
|---|---|---|---|---|
| 3-PPB | 57 | 81 | 1.6 × 10$^6$ | 169 |
| 975P | 58 | 87 | 1.2 × 10$^6$ | 168 |
| DINP | 79 | 125 | 3.5 × 10$^5$ | 177 |

FIG. 2 shows the gel/fusion curves for 3-PPB, 975P (X-20), and DINP.

The results above reflect that 3-PPB is a viable alternative for use in plastisol compositions and is an acceptable partial substitute for general purpose phthalates traditionally used in this type of application. Unexpectedly, 3-PPB has low viscosity, better rheology, and higher solvating properties when used in plastisol applications over both general purpose and other high solvating plasticizers. The 3-PPB also achieved a lower fusion temperature as shown in Table 1 and FIG. 2, which facilitates faster processing times and/or lower energy costs in plastisol applications. These results are consistent with heat rise experiments conducted with melt compounds comparing 3-PPB and DINP as reflected in FIG. 12.

Example 2

Basic Plastisol Evaluations—Processability, Permanence

The basic plastisol formulation of Example 1 was utilized in this example.

The inventive monobenzoate (X-613) was compared to DINP, IDB (isodecyl benzoate), and 2,2,4-trimethyl-1,3-pentanediol diisobutyrate (TXIB™, an Eastman trademark).

The thermogravimetric data of the neat plasticizers is shown in FIG. 3. The results demonstrate that 3-PPB is significantly less volatile than TXIB™ and IDB, has more permanence and provides a lower VOC alternative over these two plasticizers. An extended test showing volatile loss over 3 days at 70° C. comparing DINP, IDB and 3-PPB is shown in FIG. 4. The results show that 3-PPB is somewhat better than IDB in terms of volatility (permanence) over the three day period.

Initial, one-day and seven-day viscosities obtained for 3-PPB, DINP and IDB are shown in FIG. 5. This data demonstrates a higher viscosity for 3-PPB than that obtained for IDB, but much lower than the phthalate DINP. The data demonstrates that 3-PPB has good solvation properties and lower viscosity as compared to the traditional phthalate and is a viable alternative for plastisol applications. IDB has a lower viscosity, but is a poorer solvator than 3-PPB.

Example 3

Basic Plastisol Evaluation—Rheology and Gel/Fusion

The basic plastisol formulation of Example 1 was utilized in this example.

In this example, 3-PPB (X-613) was compared to DINP, Eastman's TXIB™, DOTP, 975 P (X-20), IDB and BBP (butyl benzyl phthalate). Rheology data (1 day scan) and gel/fusion curves were obtained for the group as reflected in FIGS. 6(a) and 6(b), respectively.

Viscosity for DINP, IDB and 3-PPB remained level, while DOTP and BBP increased slightly and leveled off. The dibenzoate triblend (975 P or X-20) increased rapidly, before leading to "spitting". The results show that 3-PPB is comparable to IDB and DINP and has superior rheology over X-20, BBP, and DOTP.

Gel fusion data illustrates the relative solvation characteristics of various plasticizers. FIG. 6(b) shows the results of the gel/fusion evaluation, which reflected better results for 3-PPB as compared to X-20 and unexpectedly better than the BBP control that is considered an industry standard. DOTP, DINP, and IDB demonstrated much poorer solvation properties than 3-PPB. 3-PPB is far more efficient than IDB as a solvator, yet viscosity and rheology are not sacrificed.

Overall, the results demonstrated that 3-PPB imparts a combination of excellent rheology and much better solvation properties than many currently available plasticizers.

Example 4

Basic Plastisol Evaluation—Efficiency

Figure 7:
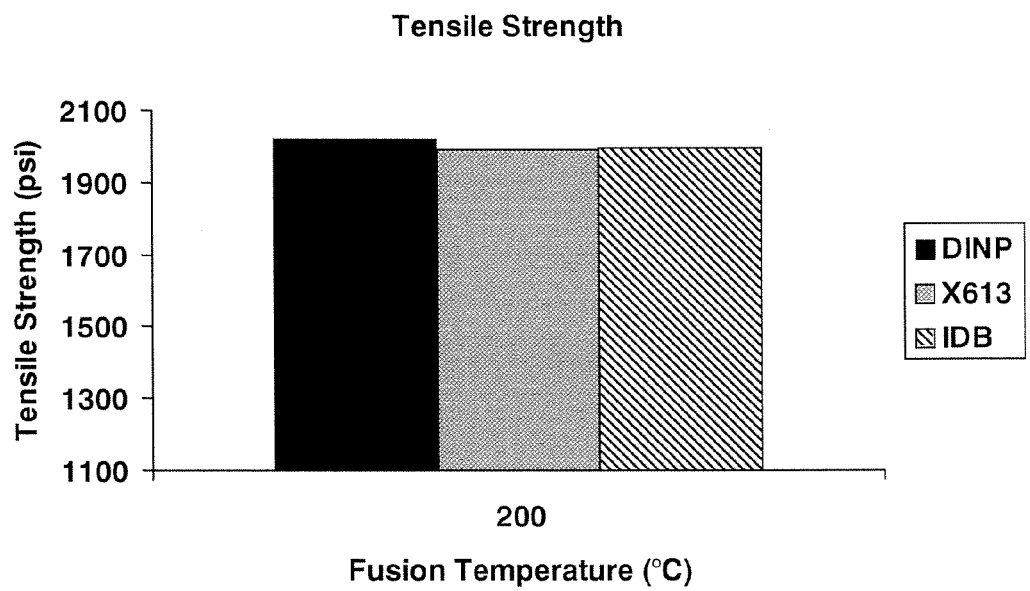
FIGS. 7($a$), ($b$) and ($c$) reflect tensile strength, modulus, and elongation values, respectively, for a plastisol comprising the inventive monobenzoate as compared to DINP and IDB.
Figure 7:
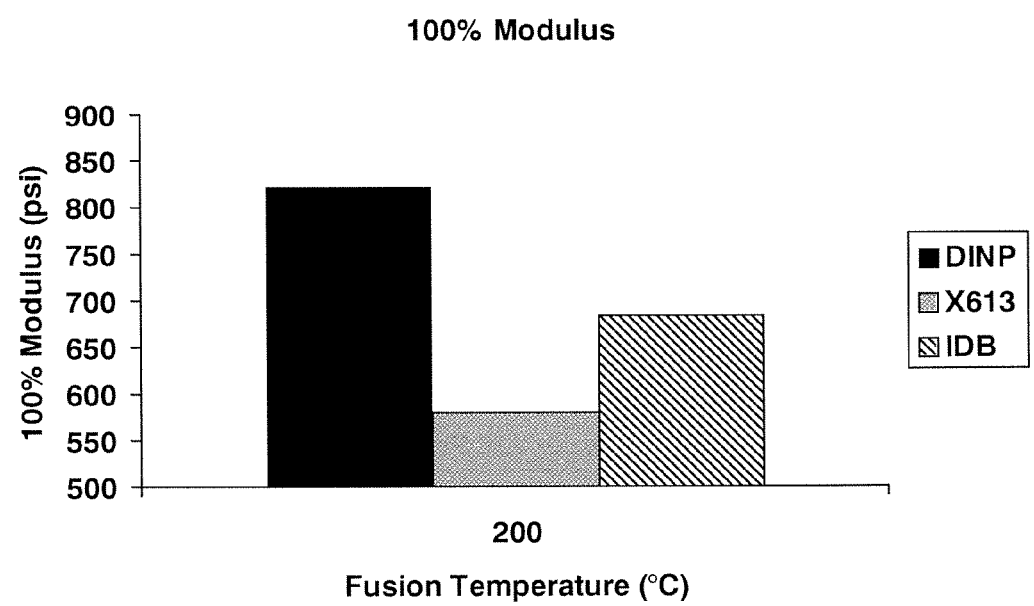

Tensile Strength (psi), 100% Modulus (psi) and Elongation (%) values were obtained for DINP, IDB and 3-PPB (X-613). The results obtained are shown in FIGS. 7(a), (b) and (c), respectively, and reflect that 3-PPB is slightly more efficient than IDB overall.

Example 5

Plastisol Wear Layer Evaluations

The basic formulations evaluated are set forth below in Table 2, including blends of DINP and IDB, DINP and 3-PPB, and DINP, IDB and 3-PPB (X-613).

TABLE 2

| | Amount (PHR) | | | | | |
|---|---|---|---|---|---|---|
| Raw Material | Control | 10 PHR IDB | 10 PHR X613 | 5 PHR IDB | 5 PHR X613 | IDB/ X613 |
| PVC (Geon 179) | 100 | 100 | 100 | 100 | 100 | 100 |
| DINP | 50 | 40 | 40 | 45 | 45 | 40 |
| Isodecyl Benzoate | 0 | 10 | 0 | 5 | 0 | 5 |
| X613 | 0 | 0 | 10 | 0 | 5 | 5 |
| ESO | 5 | 5 | 5 | 5 | 5 | 5 |
| Mineral Spirits | 5 | 5 | 5 | 5 | 5 | 5 |
| Ca/Zn Stabilizer (Mark 1221) | 3.5 | 3.5 | 3.5 | 3.5 | 3.5 | 3.5 |

FIG. 8 shows Brookfield viscosities obtained for the various formulations: initial 1 day, 3 day and 7 day as compared to the control formulation comprising 50 phr DINP. The results show that 3-PPB had higher viscosity initially than IDB, but lower than DINP.

Over time, the viscosity of 3-PPB remained fairly stable, while the formulation having 5 phr IDB increased viscosity as compared to 5 phr 3-PPB.

Gel/Fusion data obtained for the various formulations is shown below in Table 3 and gel/fusion curves are shown in FIG. 9. The results demonstrate that at equal levels, 3-PPB is better than DINP control in terms of relative solvation characteristics and is better than IDB in terms of its relative solvation characteristics.

TABLE 3

| | G' at 500 Pa | G'Max | | G' × G" |
|---|---|---|---|---|
| Plastisol | (° C.) | Temp (° C.) | Modulus (Pa) | (° C.) |
| DINP (50 PHR) | 91 | 141 | $4.8 \times 10^5$ | 191 |
| 10 PHR IDB | 87 | 139 | $2.8 \times 10^5$ | 190 |
| 5 PHR IDB | 89 | 140 | $4.0 \times 10^5$ | 191 |
| 10 PHR X613 | 80 | 134 | $3.2 \times 10^5$ | 188 |
| 5 PHR X613 | 86 | 137 | $3.8 \times 10^5$ | 190 |
| 5 PHR IDB/ 5 PHR X613 | 84 | 136 | $4.1 \times 10^5$ | 190 |

Initial shear results are depicted in FIG. 10. The results show that all of the formulations performed better than the DINP control. The results for 3-PPB reflect that it has a good rheology profile making it a suitable plasticizer for use in plastisol formulations.

The results above establish that 3-PPB is a high solvator having good solvation and lower viscosity than some traditional plasticizers, which make it suitable alone or in combination for use in plastisol applications. Traditionally used diluent plasticizers are also highly volatile, making them poor choices for use in plastisols, in view of increasing regulatory scrutiny. Traditional plasticizers often have excellent solvation or excellent rheology characteristics, but not both. Using blends of DINP (and other plasticizers) with IDB, in particular, is an attempt to achieve good solvation and rheology characteristics through blending. The present invention provides good solvation and rheology characteristics alone. It is also demonstrated to be very useful in blends.

Example 6

Melt Compounding Evaluations

Torque rheometry is a method for measuring real processing conditions of a compound. Heat rise experiments illustrate the differences between the temperatures at which fusion occurs with different plasticizers. The measured torque and temperature curves, along with the physical changes of the compound taking place can be studied. Another point of interest is the relative fusion temperature, which occurs when the stock temperature initially rapidly increases. This temperature indicates the point at which the surface solvation begins to take place, resulting in a considerable increase in torque leading to the generation of fusion in the melt compound. The relative fusion temperature is helpful in determining the solvating characteristics of the plasticizers used in plasticized PVC. From there, an analysis of how different plasticizers affect the processing ability of a PVC melt compound or plastisol can be conducted, to demonstrate how the processing factors of one plasticizer may be more favorable than the other.

Brabender Heat Rise.

The general heat rise formula shown in Table 4 below was weighed out and mixed using a metal spatula, forming a white cake-like powder. A C.W. Brabender Intellitorque® mixer was used for the study. The Brabender was equilibrated at a starting temperature of 40° C. and after being charged with 50 cc of sample, the temperature was ramped at a rate of 3° C./minute up to 200° C. Number 6 roller heads mixed the compound at a speed of 63 rpm with 1 second damping. After loading the chute was closed using a press and a 5 kg weight. Each sample was run until degradation began to occur. The plasticizers evaluated included K-FLEX® PG (referred to as PGDB, 1,2-polyethylene glycol dibenzoate), K-FLEX® 975P (referred to as 975 P or X-20, the new dibenzoate triblend comprising 20 wt. % 1,2-propylene glycol dibenzoate and 80 wt. % of an 80/20 (4:1) blend of DEG/DPG dibenzoate), K-FLEX® 850P (a dibenzoate diblend), X-613 (3-PPB), BBP, DINP, DIDC and DOTP.

The results of the heat rise experiments are shown in Tables 5 and 6.

TABLE 4

General Brabender heat rise formula

| Material | PHR |
| --- | --- |
| PVC | 100 |
| Plasticizer | 50 |
| Stearic Acid | 0.5 |
| Ca/Zn Stabilizer | 3 |
| Total: | 153.5 |

TABLE 5

Brabender heat rise data

| | First Torque Peak | | | Fusion | | |
| --- | --- | --- | --- | --- | --- | --- |
| Plasticizer | Time (min) | Torque (Nm) | Temp, ° C. | Time (min) | Torque (Nm) | Temp, ° C. |
| X-613 | 5.6 | 50 | 88 | 42 | 3 | 164 |
| PGDB | 8.4 | 45 | 87 | 44 | 4 | 168 |
| 850P | 7.9 | 50 | 87 | 44 | 4 | 168 |
| 975 P | 7.9 | 48 | 87 | 45 | 3 | 169 |
| BBP | 8.5 | 41 | 92 | 42 | 4 | 165 |
| DINP | 14 | 36 | 98 | 48 | 3 | 177 |
| DOTP | 16 | 34 | 105 | 48 | 3 | 178 |
| DIDC | 17 | 26 | 105 | 49 | 3 | 182 |

TABLE 6

Brabender heat rise data -- Degradation

| | Time (min) | Torque (Nm) | Temp (° C.) | Initial Temp (° C.) |
| --- | --- | --- | --- | --- |
| X-613 | 48 | 2 | 178 | 64 |
| PGDB | 51 | 2 | 183 | 66 |
| 850P | 48 | 3 | 176 | 67 |
| 975P | 48 | 3 | 176 | 67 |
| BBP | 46 | 3 | 175 | 69 |
| DINP | 48 | 3 | 178 | 83 |
| DOTP | 48 | 3 | 179 | 85 |
| DIDC | 50 | 3 | 182 | 89 |

Table 5, above, illustrates the torque, time and temperature for each sample and indicated when the melt flow of the compound was reached. Overall, the benzoates showed faster fusion times than the general purpose plasticizers. Shorter fusion times indicate superior solvating properties of the plasticizer.

Heat rise results of Table 6 indicate the time, torque, and temperature where degradation began to occur for each sample. The time, torque and temperature at which relative fusion occurs are also represented. DINP, DOTP and DIDC had the highest temperatures for relative fusion, indicating lower solvating ability.

FIG. 11 shows Brabender heat rise data for 3-PPB, and FIG. 12 shows Brabender data for 3-PPB compared to DINP. FIG. 12 represents a good demonstration of the high solvating properties of 3-PPB versus general purpose plasticizers. Both compounds were run using the same starting temperatures and the same temperature ramp rate. The difference in their torque values was due to the differences in fusion characteristics that each sample produced. FIG. 12 shows unequivocally that 3-PPB fused quicker than the DINP melt compound. The 3-PPB compound began fusing within the first 5 minutes of starting the run. The DINP compound required a higher temperature and more energy in order to start fusing.

Brabender Isothermal Evaluations—

The same plasticizers tested in the heat rise experiments were tested for the isothermal tests. The formula utilized was modified slightly to include epoxidized soybean oil (ESO) as well as higher levels of stearic acid and plasticizer. The formula is set forth below in Table 7.

Using the formula in Table 7, the raw materials were weighed out and mixed with a metal spatula. In this test, the Brabender Intellitorque® was programmed to remain at a constant temperature of 150° C. The sample volume of 50 cc was loaded in the same manner as in the heat rise tests. The experiments were terminated at the onset of rapid torque increase.

TABLE 7

General Brabender isothermal formula

| Material | PHR |
| --- | --- |
| PVC | 100 |
| Plasticizer | 70 |
| Stearic Acid | 0.5 |
| ESO | 2 |
| Ca/Zn Stabilizer | 1.5 |
| Total: | 174 |

The isothermal test is important because different plasticizers can be analyzed for effect of solvator class too. This experiment simulates actual processing conditions better and can be used to rank the ability of the plasticizers to facilitate the processing of vinyl. The data below in Table 8 show very little distinction between the various high solvating and general purpose plasticizers that were tested, as the melt compounds fused very rapidly, because they were subjected to such a high temperature for the entire test. None of the samples underwent degradation during their test times.

The results of the melt compounding evaluations show that 3-PPB is compatible in PVC melt compounding applications and has excellent solvating properties compared to the dibenzoate blends and general purpose plasticizers.

TABLE 8

Isothermal Brabender data

| Plasticizer | MaxTorque (Nm) |
|---|---|
| X-613 | 9 |
| PGDB | 11 |
| 850P | 11 |
| 975P | 12 |
| BBP | 10 |
| DINP | 8 |
| DOTP | 7 |
| DIDC | 6 |

Example 7

Monobenzoate/Dibenzoate Blends

Evaluations of blends of the inventive monobenzoate, 3-PPB (X-613), with a unique dibenzoate triblend (K-FLEX® 975 P) were conducted.

A control plastisol comprising 70 phr K-FLEX® 975P was compared to plastisols comprising 3.5 (5 wt. %), 7 (10 wt. %) and 10.5 phr (15 wt. %) X-613 in combination with 66.5, 63, and 59.5 phr of K-FLEX® 975P, respectively. The formulations evaluated are set forth below in Table 9.

TABLE 9

| Raw materials | Control (phr) | 5 wt. % X-613 (phr) | 10 wt. % X-613 (phr) | 15 wt. % X-613 (phr) |
|---|---|---|---|---|
| Geon 121 A | 100 | 100 | 100 | 100 |
| K-Flex ® 975P | 70 | 66.5 | 63 | 59.5 |
| X-613 | — | 3.5 | 7 | 10.5 |
| Mark 1221 | 3 | 3 | 3 | 3 |
| Totals | 173 | 173 | 173 | 173 |

FIG. 13 shows Brookfield viscosities obtained for the various formulations initially, and at days 1, 3 and 7. Overall, the addition of X-613 to the dibenzoate triblend, K-FLEX® 975 P, resulted in fairly stable viscosities over time regardless of the amount of monobenzoate included in the formulation. Viscosities obtained for the formulation having no monobenzoate are slightly higher than for formulations having various concentrations of X-613.

FIGS. 14-17 reflect the initial, one-day, three-day, and seven-day shear results obtained for the various formulations. The formulations containing the inventive monobenzoate, X-613, showed lower viscosity increase with increasing shear as compared to the control with no X-613, thus confirming good rheology and improved processability of the plastisol with the added inventive monobenzoate. Formulations containing 15 wt. % monobenzoate showed exceptionally good rheology as compared to the control.

Figure 18A:
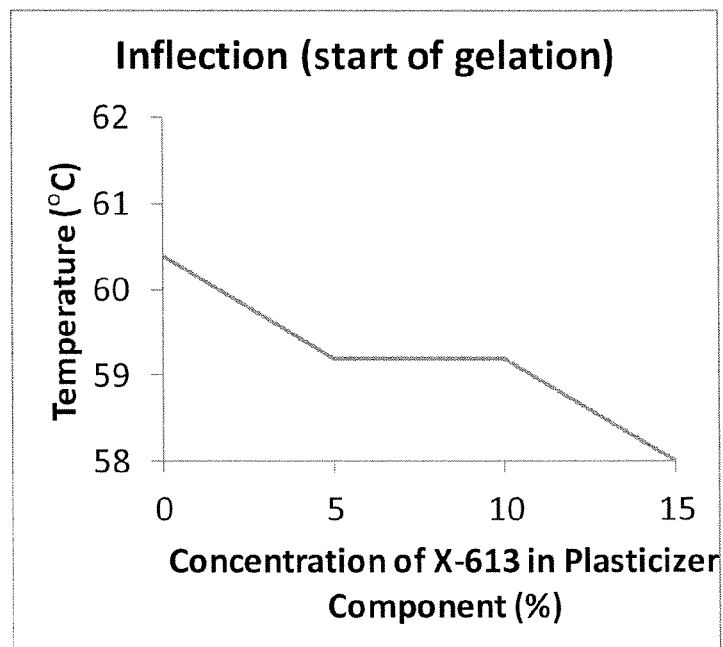
FIGS. 18($a$) and ($b$) show inflection (start of gelation) and G' Max (peak gelation), respectively, for various concentrations (wt. %) of the inventive monobenzoate in a plasticizer component.
Figure 18B:
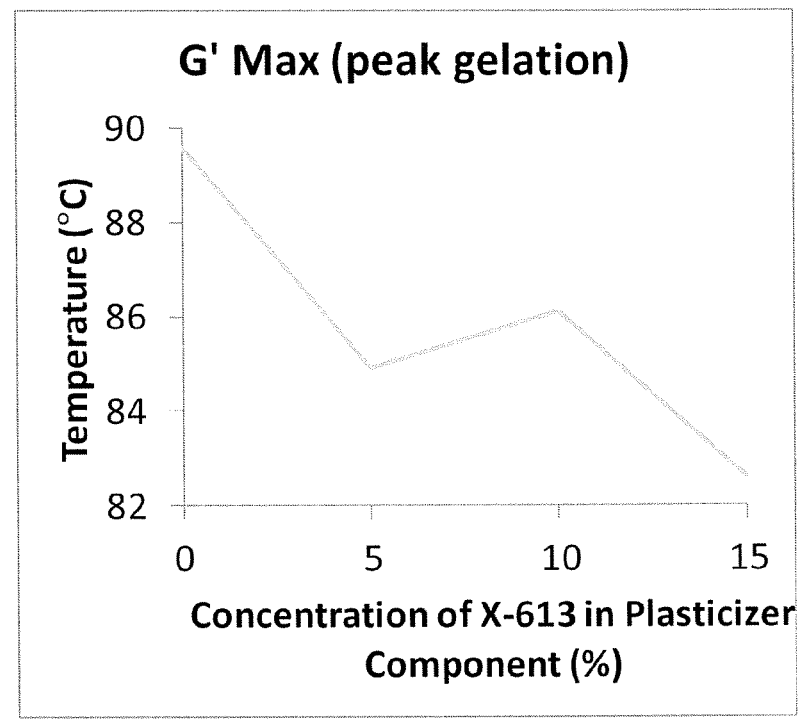

FIGS. 18(a) and (b) show the gel/fusion results for the various formulations. All formulations containing the inventive monobenzoate, 3-PPB (X-613), had lower inflection (start of gelation) and lower G' Max (peak gelation) as compared to the control. These results show that adding the inventive monobenzoate improved the solvating characteristics of the dibenzoate triblend.

Example 8

Monobenzoate/Dibenzoate/DINCH® Blends

Additional evaluations were conducted with a variety of basic plastisol formulations containing one or more of DINP (diisononyl phthalate), K-FLEX® 975 P, Hexamoll® DINCH® (diisononyl-1,2-cyclohexane dicarboxylate; a registered trademark of BASF SE, FED. REP. Germany), and the inventive monobenzoate, X-613. The formulations evaluated are set forth in Table 10, below.

TABLE 10

| Formulation | Raw Materials | PHR | Wt. % |
|---|---|---|---|
| 100% DINP | Geon 121 A | 100 | 57.8 |
| | DINP | 70 | 40.5 |
| | Mark 1221 | 3 | 1.7 |
| | Totals | 173 | 100 |
| 100% DINCH | Geon 121 A | 100 | 57.8 |
| | DINCH | 70 | 40.5 |
| | Mark 1221 | 3 | 1.7 |
| | Totals | 173 | 100 |
| 100% X-613 | Gaon 121 A | 100 | 57.8 |
| | X-613 | 70 | 40.5 |
| | Mark 1221 | 3 | 1.7 |
| | Totals | 173 | 100 |
| 60:40 DINCH/975P | Geon 121A | 100 | 57.8 |
| | DINCH | 42 | 24.3 |
| | 975P | 28 | 16.2 |
| | Mark 1221 | 3 | 1.7 |
| | Totals | 173 | 100 |
| 60:40 DINCH/(15:85 X-613/975P) | Geon 121 A | 100 | 57.8 |
| | DINCH | 42 | 24.3 |
| | X613 | 4.2 | 2.4 |
| | 975 P | 23.8 | 13.8 |
| | Mark 1221 | 3 | 1.7 |
| | Totals | 173 | 100 |
| 60:40 DINCH/(5:95 X-613/975P) | Geon 121 A | 57.8 | 57.8 |
| | DINCH | 42 | 24.3 |
| | X613 | 1.4 | 0.8 |
| | 975 P | 26.6 | 15.4 |
| | Mark 1221 | 3 | 1.7 |
| | Totals | 173 | 100 |
| 40:60 DINCH/975P | Geon 121 A | 100 | 57.8 |
| | DINCH | 28 | 16.2 |
| | 975 P | 42 | 24.3 |
| | Mark 1221 | 3 | 1.7 |
| | Totals | 173 | 100 |
| 40:60 DINCH/X-613 | Geon 121 A | 100 | 57.8 |
| | DINCH | 28 | 16.2 |
| | X613 | 42 | 24.3 |
| | Mark 1221 | 3 | 1.7 |
| | Totals | 173 | 100 |
| 40:60 DINCH/(15:85 X-613/975P) | Geon 121 A | 100 | 57.8 |
| | DINCH | 28 | 16.2 |
| | X613 | 6.3 | 3.6 |

TABLE 10-continued

| Formulation | Raw Materials | PHR | Wt. % |
|---|---|---|---|
| | 975 P | 35.7 | 20.6 |
| | Mark 1221 | 3 | 1.7 |
| | Totals | 173 | 100 |
| 40:60 DINCH/(5:95 X-613/975P) | Geon 121 A | 100 | 57.8 |
| | DINCH | 28 | 16.2 |
| | X613 | 2.1 | 1.2 |
| | 975 P | 39.9 | 23.1 |
| | Mark 1221 | 3 | 1.7 |
| | Totals | 173 | 100 |
| 20:80 DINCH/975 P | Geon 121 A | 100 | 57.8 |
| | DINCH | 14 | 8.1 |
| | 975 P | 56 | 32.4 |
| | Mark 1221 | 3 | 1.7 |
| | Totals | 173 | 100 |
| 20:80 DINCH/X-613 | Geon 121 A | 100 | 57.8 |
| | DINCH | 14 | 8.1 |
| | X613 | 56 | 32.4 |
| | Mark 1221 | 3 | 1.7 |
| | Totals | 173 | 100 |
| 20:80 DINCH/(15:85 X-613/975P) | Geon 121 A | 100 | 57.8 |
| | DINCH | 14 | 8.1 |
| | X613 | 8.4 | 4.9 |
| | 975 P | 47.6 | 27.5 |
| | Mark 1221 | 3 | 1.7 |
| | Totals | 173 | 100 |

FIG. 19 shows the viscosities obtained for formulations comprising 100% DINP and DINCH® and for three 3:2 (60:40) DINCH® blends, one comprising 975 P alone, another comprising a 3:17 (15:85) blend of X-6131975P, and the third comprising a 1:19 (5:95) blend of X-6131975P. Results for the blends containing the inventive monobenzoate, X-613, and the dibenzoate triblend were only slightly higher than with DINCH® alone, particularly at the 15 wt. % concentration of X-613 in the dibenzoate triblend blended with DINCH®, and were lower than that obtained for the general purpose plasticizer, DINP.

FIGS. 20 and 21 show initial and one-day shear results obtained for the three, 3:2 DINCH® blends above as compared to DINP and DINCH® alone. Results show comparable rheology profiles, initially and at one-day, for the 3:2 DINCH®:benzoate blends as compared to DINP and DINCH® alone. X-613 in the blend with 975P (triblend) had a better rheology profile than DINP, which is the industry benchmark for plasticizer performance. DINCH® achieved slightly lower viscosities alone, but its gel fusion properties without the inclusion of high solvators was really poor. X-613 contributed both solvating properties and good rheology to the blends.

FIG. 22 shows viscosity results obtained for formulations containing 100% DINP and DINCH® as compared to four 2:3 (40:60) DINCH®/Benzoate blends. Viscosity results for the 2:3 DINCH®:benzoate blends containing the dibenzoate triblend alone and in combination with X-613 were very comparable to that obtained for the general purpose plasticizer DINP. Viscosity results obtained for a 2:3 DINCH®:X-613 (100%) blend were lower than that obtained for DINCH.

FIGS. 23 and 24 show initial and one-day shear results obtained for DINP, DINCH®, and 2:3 DINCH®:benzoate blends, one of which comprised the dibenzoate triblend (975 P) alone and two of which comprised the dibenzoate triblend in combination with 5 wt. % and 15 wt. % X-613. Overall, the DINCH®:benzoate blends had similar rheology to DINCH® and DINP alone, albeit at higher viscosities. The 2:3 DINCH:benzoate blend comprising 15 wt. % X-613 in the dibenzoate triblend performed as well as DINP or DINCH®. All of the blends performed comparably and no worse than DINP alone. All of the blends exhibited reasonable viscosity and were processable. Moreover, when the inventive monobenzoate, X-613, was used alone with the DINCH® very good stability resulted.

FIG. 25 shows viscosity results obtained for formulations comprising 100% DINP and DINCH®, and for three 1:4 DINCH®:benzoate blends, one comprising the dibenzoate triblend alone, another comprising the inventive monobenzoate (X-613) alone, and the other comprising a blend of the dibenzoate triblend and the monobenzoate. Viscosities rose over time for the 1:4 DINCH®:benzoate blends as compared to the lower rise in viscosity for DINP and DINCH®. The 1:4 DINCH®:X-613 blend showed very comparable viscosity to DINCH® alone.

The results above demonstrated that the inventive monobenzoate alone, or in combination with the dibenzoate triblend, or the dibenzoate triblend alone, are better solvators that can improve the compatibility in plastisols of poorer solvators, such as DINP and DINCH®. In plastisols, the inventive monobenzoate alone tended to exhibit lower viscosities than the general purpose type plasticizers. The dibenzoate triblend (975P) demonstrated higher viscosities than the monobenzoate and general purpose plasticizer controls, but showed much better gel/fusion characteristics than the general purpose plasticizers. When the inventive monobenzoate is blended with the triblend, the viscosity was lowered and rheology was improved. All of the plastisols using the plasticizers of the invention achieved processable viscosities.

In accordance with the patent statutes, the best mode and preferred embodiments have been set forth; the scope of the invention is not limited thereto, but rather by the scope of the attached claims.

What is claimed is:

1. A plastisol composition comprising:
   a. a polyvinyl chloride (PVC)-based or an acrylic-based polymer dispersion wherein the acrylic-based polymer is a homopolymer or copolymer of polymethacrylate, aromatic methacrylates, alkylacrylates, or acrylic acid; and
   b. a plasticizer consisting of 3-phenylpropyl benzoate, wherein the plasticizer provides improved solvation and rheology characteristics and improved gel/fusion temperatures over that achieved with other known high solvating plasticizers used in plastisols.

2. A plasticizer blend for use in plastisol compositions consisting of:
   3-phenyl propyl benzoate,
   diisononyl-1,2-cyclohexane dicarboxylate, and
   a dibenzoate triblend comprising 20 wt. % of 1,2-propylene glycol dibenzoate and 80 wt % of a 4:1 diethylene glycol dibenzoate:dipropylene glycol dibenzoate.

3. The plasticizer blend of claim 2, wherein the plastisol composition comprises a polyvinyl chloride polymer dispersed in the plasticizer blend.

4. A plasticizer blend for use in plastisol compositions consisting of:
   3-phenyl propyl benzoate,
   di-2-ethylhexyl terephthalate, and
   a dibenzoate triblend comprising 20 wt % of 1,2-propylene glycol dibenzoate and 80 wt. % of a 4:1 diethylene glycol dibenzoate:dipropylene glycol dibenzoate.

5. The plasticizer blend of claim 4, wherein the plastisol composition comprises a polyvinyl chloride polymer dispersed in the plasticizer blend.

6. A method of plasticizing a polyvinyl chloride (PVC) based-plastisol or an acrylic based-plastisol, comprising the step of:

adding 3-phenylpropyl benzoate to a primary plasticizer selected from the group consisting of di-2-ethylhexyl terephthalate, diisononyl-1,2-cyclohexane dicarboxylate, a dibenzoate triblend comprising 20 wt. % of 1,2-propylene glycol dibenzoate and 80 wt. % of a 4:1 diethylene glycol dibenzoate:dipropylene glycol dibenzoate, and mixtures thereof, wherein the PVC-based plastisol comprises a homopolymer or copolymer of polyvinyl chloride, and wherein the acrylic-based plastisol comprises a homopolymer or copolymer of polymethacrylates, aromatic methacrylates, alkylacrylates, or acrylic acid.

\* \* \* \* \*